US010206107B2

(12) United States Patent
Bicket et al.

(10) Patent No.: US 10,206,107 B2
(45) Date of Patent: Feb. 12, 2019

(54) SECURE OFFLINE DATA OFFLOAD IN A SENSOR NETWORK

(71) Applicant: Samsara Networks Inc., San Francisco, CA (US)

(72) Inventors: John Bicket, San Francisco, CA (US); James Michael Rowson, San Francisco, CA (US); Chase Phillips, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 16/010,383

(22) Filed: Jun. 15, 2018

(65) Prior Publication Data

US 2018/0295517 A1    Oct. 11, 2018

Related U.S. Application Data

(62) Division of application No. 14/960,824, filed on Dec. 7, 2015, now Pat. No. 10,033,706.

(Continued)

(51) Int. Cl.
*H04L 29/06* (2006.01)
*H04W 12/06* (2009.01)
(Continued)

(52) U.S. Cl.
CPC ............ *H04W 12/06* (2013.01); *H04L 12/66* (2013.01); *H04L 63/0428* (2013.01);
(Continued)

(58) Field of Classification Search
None
See application file for complete search history.

(56) References Cited

U.S. PATENT DOCUMENTS 7,668,794 B2 *  2/2010  Wang ................... G06Q 10/087
                                                             455/342
8,051,489 B1   11/2011  Montenegro
(Continued)

OTHER PUBLICATIONS

Mahdin, Hairulnizam, and Jemal Abawajy. "An Approach for Removing Redundant Data from RFID Data Streams." Sensors (Basel, Switzerland) 11.10 (2011): 9863-9877; accessed via https://www.ncbi.nlm.nih.gov/pmc/articles/PMC3231251 on Mar. 26, 2018.*
(Continued)

*Primary Examiner* — Jeffery L Williams
(74) *Attorney, Agent, or Firm* — Nicholson De Vos Webster & Elliott LLP

(57) ABSTRACT

Methods and systems for secure data offload in a sensor network. The method comprises offloading data indicative of sensor measurements from a wireless sensing device to a gateway device through a first secure communication channel; and storing the data at the gateway device if there is not currently a second secure communication channel established between the gateway device and the management server. The method continues with offloading the data to the management server when the second secure communication channel is established; and reconciling the data at the management server to generate reconciled sensor measurements in which duplicates have been removed.

6 Claims, 24 Drawing Sheets

Related U.S. Application Data

(60) Provisional application No. 62/263,563, filed on Dec. 4, 2015.

(51) Int. Cl.

| | | |
|---|---|---|
| *H04W 12/04* | (2009.01) | |
| *H04W 4/70* | (2018.01) | |
| *H04W 4/80* | (2018.01) | |
| *H04L 12/66* | (2006.01) | |
| *H04W 12/02* | (2009.01) | |
| *H04W 28/08* | (2009.01) | |
| *H04W 4/38* | (2018.01) | |
| *H04W 84/18* | (2009.01) | |

(52) U.S. Cl.
CPC .......... *H04L 63/0823* (2013.01); *H04W 4/38* (2018.02); *H04W 4/70* (2018.02); *H04W 4/80* (2018.02); *H04W 12/02* (2013.01); *H04W 12/04* (2013.01); *H04W 28/085* (2013.01); *H04W 84/18* (2013.01); *G06F 2221/2151* (2013.01)

(56) References Cited

U.S. PATENT DOCUMENTS

| | | | |
|---|---|---|---|
| 8,365,293 B2 | 1/2013 | Brown et al. | |
| 8,860,569 B2 | 10/2014 | Hruska et al. | |
| 8,984,113 B2 | 3/2015 | Li et al. | |
| 9,445,270 B1* | 9/2016 | Bicket | H04W 4/70 |
| 9,838,204 B2 | 12/2017 | Schultz et al. | |
| 9,848,035 B2 | 12/2017 | Pogorelik et al. | |
| 9,860,677 B1 | 1/2018 | Agerstam et al. | |
| 2003/0028805 A1 | 2/2003 | Lahteenmaki et al. | |
| 2003/0237004 A1 | 12/2003 | Okamura | |
| 2004/0015318 A1 | 1/2004 | Heller et al. | |
| 2004/0098581 A1 | 5/2004 | Balfanz et al. | |
| 2005/0149723 A1 | 7/2005 | Watkins et al. | |
| 2005/0154909 A1 | 7/2005 | Zhang et al. | |
| 2007/0208680 A1* | 9/2007 | Wang | G06Q 10/087 706/47 |
| 2008/0292105 A1 | 11/2008 | Wan et al. | |
| 2011/0145894 A1 | 6/2011 | Garcia et al. | |
| 2012/0155301 A1* | 6/2012 | Miyazaki | H04L 43/00 370/252 |
| 2013/0057388 A1* | 3/2013 | Attanasio | G06Q 50/26 340/10.1 |
| 2015/0091739 A1* | 4/2015 | Ridley | H04Q 9/00 340/870.03 |
| 2015/0134954 A1 | 5/2015 | Walley et al. | |
| 2015/0351084 A1* | 12/2015 | Werb | H04W 4/70 370/329 |
| 2015/0381737 A1* | 12/2015 | Quinn | H04L 67/12 709/217 |
| 2016/0007288 A1 | 1/2016 | Samardzija et al. | |
| 2016/0295364 A1 | 10/2016 | Zakaria | |
| 2016/0300183 A1* | 10/2016 | Berger | G06Q 10/08 |
| 2017/0163608 A1* | 6/2017 | Bicket | H04W 4/70 |
| 2017/0265046 A1* | 9/2017 | Chen | H04W 4/08 |
| 2017/0272316 A1* | 9/2017 | Johnson | H04L 61/301 |
| 2018/0295517 A1* | 10/2018 | Bicket | H04W 4/70 |

OTHER PUBLICATIONS

S. Jeon, B. Hong, J. Kwon, Y.-s. Kwak, S. Song, "Redundant data removal technique for efficient big data search processing", Int. J. Softw. Eng. Appl., 7 (4) (Jul. 2013), pp. 427-436.*

Corrected Notice of Allowance from U.S. Appl. No. 14/960,866, dated Aug. 8, 2016, 2 pages.

Cuixia et al., "Study on energy saving and security of Bluetooth sensor network", Proceedings of the 2009 International Symposium on Web Information Systems and Applications, May 22-24, 2009, pp. 303-305.

Dziengel et al., "Secure Communications for Event-Driven Wireless Sensor Networks", In Proceedings of the Third International Symposium on Sensor Networks and Applications (SNA '11), Nov. 2011, 7 pages.

Gomez C., et al.,"Overview and Evaluation of Bluetooth Low Energy: An Emerging Low-Power Wireless Technology," open Access, Sensors 2012, 12, Aug. 29, 2012, pp. 11734-11753.

Jeon S., et al., "Redundant Data Removal Technique for Efficient Big Data Search Processing," Jul. 2013, International Journal of Software Engineering and its Applications, vol. 7 (4), pp. 427-436.

Mahdin H., et al., "An Approach for Removing Redundant Data from RFID Data Streams," Sensors, Oct. 2011, vol. 11 (10), pp. 9863-9877.

Notice of Allowance from U.S. Appl. No. 14/960,824, dated Apr. 18, 2018, 23 pages.

Notice of Allowance from U.S. Appl. No. 14/960,866, dated Jul. 1, 2016, 16 pages.

Padgette et al., "Guide to Bluetooth Security; Recommendations of the National Institute of Standards and Technology", Special Publication 800-121 Revision 1, Jun. 2012, 47 pages.

Shi et al., "Designing Secure Sensor Networks", Wireless Sensor Networks, IEEE Wireless Communications, Dec. 2004, pp. 1-6.

Wireless Sensor Tags; Monitor and Find Everything from the Internet-Wireless Sensor Tags, , retrieved Dec. 7, 2015, 9 pages.

Wireless Sensor Tags; Wireless Tag-iOS App User Manual, , retrieved Dec. 7, 2015, 10 pages.

Notice of Allowance from U.S. Appl. No. 15/243,676, dated Jun. 28, 2018, 26 pages.

* cited by examiner

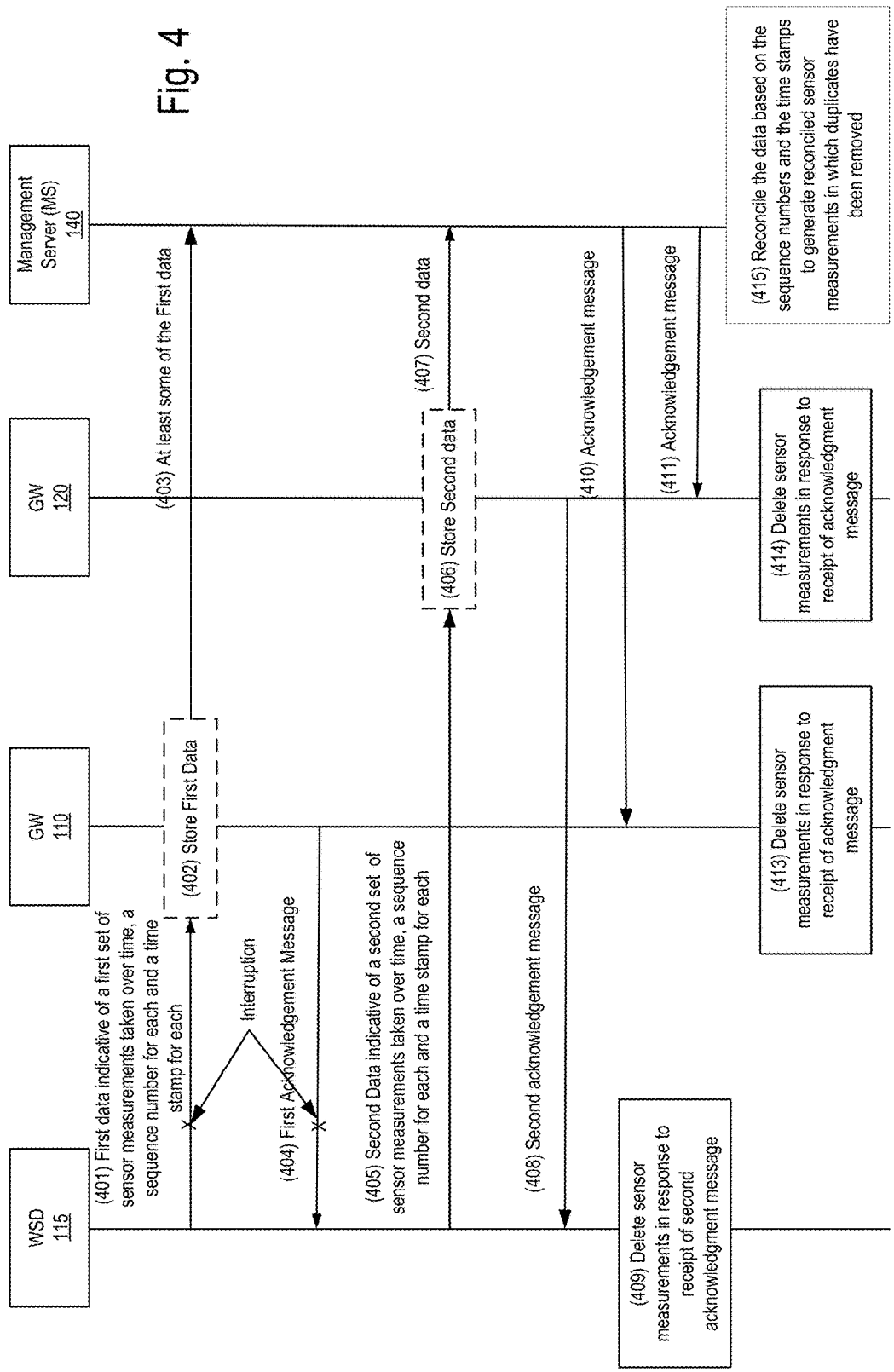

```
┌─────────────────────────────────────────────────────────────────────────────┐
│ Receive, upon establishment of a first secure communication channel between a first gateway device of a │
│ plurality of gateway devices and the management server, data indicative of a first plurality of sensor │
│ measurements taken over time, a sequence number for each, and a time stamp for each, wherein the data │
│ was transmitted to the first gateway device from a first sensing device of the plurality of sensing devices over │
│ a second secure wireless communication channel between the first gateway device and the first sensing │
│ device, and wherein the management server tracks which of the plurality of gateway devices and which of │
│ the plurality of sensing devices is associated with which of a plurality of organizations │
│ 502 │
└─────────────────────────────────────────────────────────────────────────────┘
                                        │
                                        ▼
┌─────────────────────────────────────────────────────────────────────────────┐
│ Receive, upon establishment of a third secure communication channel between a second gateway device of │
│ the plurality of gateway devices and the management server, data indicative of a second plurality of sensor │
│ measurements taken over time, a sequence number for each, and a time stamp for each, wherein the data │
│ was transmitted to the second gateway device from the sensing device through a fourth secure channel │
│ between the second gateway device and the sensing device following disconnection of the second secure │
│ communication channel between the first gateway device and the sensing device │
│ 504 │
└─────────────────────────────────────────────────────────────────────────────┘
                                        │
                                        ▼
┌─────────────────────────────────────────────────────────────────────────────┐
│ Reconcile the data indicative of the first plurality of sensor measurements and the data indicative of the │
│ second plurality of sensor measurements based on the sequence numbers and the time stamps to generate │
│ reconciled sensor measurements in which duplicates have been removed │
│ 506 │
└─────────────────────────────────────────────────────────────────────────────┘
                                        │
                                        ▼
┌─────────────────────────────────────────────────────────────────────────────┐
│ Provide for display a user interface including a representation of the reconciled sensor measurements over │
│ time │
│ 508 │
└─────────────────────────────────────────────────────────────────────────────┘
```

Fig. 5

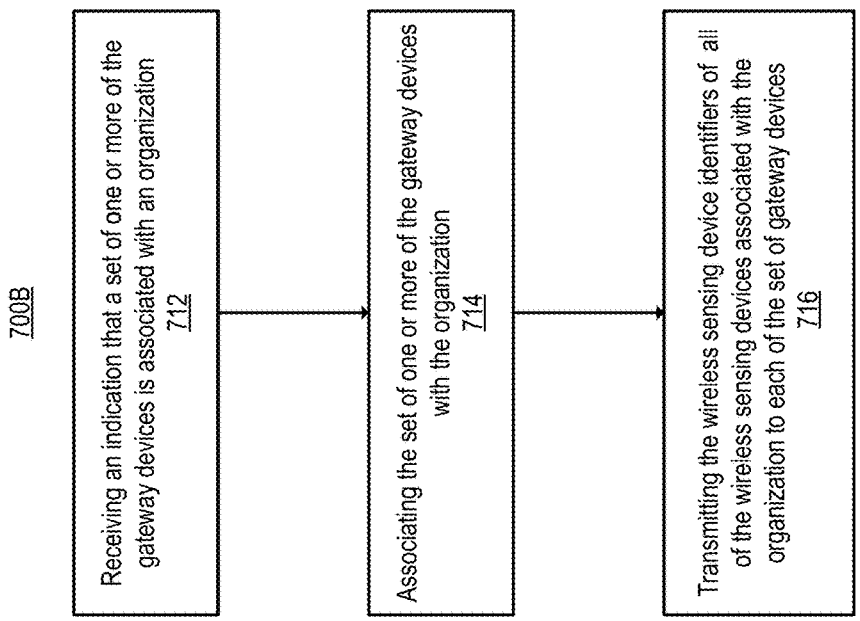

900

Receive, from the gateway device, a certificate [and a second digital signature] wherein the certificate was generated by the management server upon a determination that the gateway device and the wireless sensing device are associated and is a digital document including data and a digital signature, wherein the digital signature was generated by the management server based on the data and a private key of the management server, and wherein the data includes a first identifier[, a public key of the gateway device,] and a second identifier, [and wherein the second digital signature is generated at the gateway device with a private key of the gateway device based upon the certificate]
910

Confirm that the wireless sensing device is authorized to upload data to the gateway device
920

Check that the second identifier matches a sensing device identifier stored in the wireless sensing device
922

Authenticate the second digital signature using the public key of the gateway device that is part of the data of the certificate.
923

Authenticate the certificate using a public key associated with the private key of the management server
924

In response to the confirming that the wireless sensing device is authorized to upload data the gateway device, uploading to the gateway device data indicative of a plurality of sensor measurements taken over time to be transmitted to the management server, wherein the plurality of sensor measurements are representative of physical events detected at the wireless sensing device
930

Fig. 9

SECURE OFFLINE DATA OFFLOAD IN A SENSOR NETWORK

CROSS-REFERENCE TO RELATED APPLICATIONS

This application is a divisional of U.S. application Ser. No. 14/960,824, filed Dec. 7, 2015, which claims the benefit of U.S. Provisional Application No. 62/263,563, filed Dec. 4, 2015, which are hereby incorporated by reference.

TECHNICAL FIELD

Embodiments of the invention relate to the field of sensor networks, and more specifically, to the secure offline data offload in a sensor network.

BACKGROUND ART

A sensor network includes spatially distributed autonomous sensing devices to monitor physical or environmental conditions, (such as temperature, humidity, pressure, movement, etc.) and to record data about the physical events to deliver the data through the network to a user's location. In some networks the communication channels between the user and the sensing devices are bi-directional, also enabling control of the sensing devices. Today such networks are used in many industrial and consumer applications, such as industrial process monitoring and control, machine health monitoring, transport of goods etc.

SUMMARY OF THE INVENTION

In an embodiment, a method in a gateway device for enabling secure offline data logging in a sensor networks is described. The method includes receiving from a wireless sensing device an advertisement message indicating it is available for connecting to a gateway device. The method also includes confirming that the gateway device has been authorized by a management server to offload from the wireless sensing device sensor measurements taken over time by the wireless sensing device and stored in a non-transitory machine readable storage medium of the wireless sensing device. The method also includes establishing a first secure communication channel with the wireless sensing device. The method also includes receiving from the wireless sensing device, through the first secure communication channel, data indicative of a plurality of sensor measurements taken over time, a sequence number for each, and a time stamp for each. The method also includes transmitting from the gateway device an acknowledgement message to the wireless sensing device that indicates that the data has been received by the gateway device and that instructs the wireless sensing device to delete the plurality of sensor measurements from the wireless sensing device. The method also includes if there is not currently a second secure communication channel established between the gateway device and the management server, storing the data in a non-transitory machine readable storage medium of the gateway device. The method also includes when there is the second secure communication channel established between the gateway device and the management server, transmitting to the management server the data. The method also includes receiving an acknowledgement message from the management server that indicates that the data has been received by the management server and that instructs the gateway device to delete the data from gate Other embodiments of this aspect include corresponding computer systems, apparatus, and computer programs recorded on one or more computer storage devices, each configured to perform the actions of the methods.

In an embodiment, a gateway device to be coupled with a wireless sensing device of a sensor network, where the sensor network includes a management server, is described. The gateway includes a communication interface to receive from a wireless sensing device an advertisement message indicating it is available for connecting to a gateway device. The gateway device also includes a non-transitory computer readable storage medium to store instructions; and a processor coupled with the non-transitory computer readable storage medium to process the stored instructions to confirm that the gateway device has been authorized by a management server to offload from the wireless sensing device sensor measurements taken over time by the wireless sensing device and stored in a non-transitory machine readable storage medium of the wireless sensing device. The processor is further to establish through the communication interface a first secure communication channel with the wireless sensing device. The processor is further to receive through the communication interface from the wireless sensing device, through the first secure communication channel, data indicative of a plurality of sensor measurements taken over time, a sequence number for each, and a time stamp for each. The processor is further to transmit from the gateway device an acknowledgement message to the wireless sensing device that indicates that the data has been received by the gateway device and that instructs the wireless sensing device to delete the plurality of sensor measurements from the wireless sensing device. The processor is further, if there is not currently a second secure communication channel established between the gateway device and the management server, to store the data in the non-transitory computer readable storage medium of the gateway device. The gateway device also includes when there is the second secure communication channel established between the gateway device and the management server, transmit to the management server the data. The processor is further to receive through the communication interface an acknowledgement message from the management server that indicates that the data has been received by the management server and that instructs the gateway device to delete the data from gateway device.

In an embodiment, a method in a management server device for supporting secure offline data logging in sensor networks, where the sensor networks include a plurality of wireless sensing devices operative to detect physical events and to generate sensor measurements in response to the detection of the physical events, is described. The method includes receiving, upon establishment of a first secure communication channel between a first gateway device of a plurality of gateway devices and the management server device, data indicative of a first plurality of sensor measurements taken over time, a sequence number for each, and a time stamp for each, where the data was transmitted to the first gateway device from a first wireless sensing device of the plurality of wireless sensing devices over a second secure communication channel between the first gateway device and the first wireless sensing device, and where the management server device tracks which of the plurality of gateway devices and which of the plurality of wireless sensing devices is associated with which of a plurality of organizations. The method also includes receiving, upon establishment of a third secure communication channel between a second gateway device of the plurality of gateway devices and the management server device, data indicative of a second plurality of sensor measurements taken over time, a sequence number for each, and a time stamp for each, where the data was transmitted to the second gateway device from the wireless sensing device through a fourth secure communication channel between the second gateway device and the wireless sensing device following disconnection of the second secure communication channel between the first gateway device and the wireless sensing device. The method also includes reconciling the data indicative of the first plurality of sensor measurements and the data indicative of the second plurality of sensor measurements based on the sequence numbers and the time stamps to generate reconciled sensor measurements in which duplicates have been removed. The method also includes providing for display a user interface including a representation of the reconciled sensor measurements.

In an embodiment, a management server device for supporting secure offline data logging in sensor networks, where the sensor networks include a plurality of wireless sensing devices operative to detect physical events and to generate sensor measurements in response to the detection of the physical events is described. The management server device includes a non-transitory computer readable storage medium to store instructions; and a processor coupled with the non-transitory computer readable storage medium to process the stored instructions to receive, upon establishment of a first secure communication channel between a first gateway device of a plurality of gateway devices and the management server device, data indicative of a first plurality of sensor measurements taken over time, a sequence number for each, and a time stamp for each, where the data was transmitted to the first gateway device from a first wireless sensing device of the plurality of wireless sensing devices over a second secure communication channel between the first gateway device and the first wireless sensing device, and where the management server device tracks which of the plurality of gateway devices and which of the plurality of wireless sensing devices is associated with which of a plurality of organizations. The processor is further to includes receive, upon establishment of a third secure communication channel between a second gateway device of the plurality of gateway devices and the management server device, data indicative of a second plurality of sensor measurements taken over time, a sequence number for each, and a time stamp for each, where the data was transmitted to the second gateway device from the wireless sensing device through a fourth secure communication channel between the second gateway device and the wireless sensing device following disconnection of the second secure communication channel between the first gateway device and the wireless sensing device. The processor is further to reconcile the data indicative of the first plurality of sensor measurements and the data indicative of the second plurality of sensor measurements based on the sequence numbers and the time stamps to generate reconciled sensor measurements in which duplicates have been removed. The processor is further to provide for display a user interface including a representation of the reconciled sensor measurements.

BRIEF DESCRIPTION OF THE DRAWINGS

The invention may best be understood by referring to the following description and accompanying drawings that are used to illustrate embodiments of the invention. In the drawings:

FIG. 4 illustrates a block diagram of exemplary operations for enabling secure and reliable offload of sensor measurements in intermittent connectivity or mobility of a wireless sensing device in accordance with some embodiments.

FIG. 5 illustrates a flow diagram of operations performed in a management server of a sensor network in accordance with some embodiments.

FIG. 7A illustrates a flow diagram of operations performed in a management server of a sensor network when wireless sensing devices are claimed by an organization in accordance with some embodiments.

FIG. 7B illustrates a flow diagram of operations performed in a management server of a sensor network when gateway devices are claimed by an organization in accordance with some embodiments.

FIG. 9 illustrates a flow diagram of exemplary operations performed in a sensing device for authorizing and authenticating a gateway device to receive sensor measurements in accordance with some embodiments.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Secure and Reliable Offload of Data in a Sensor Network:

Systems and methods of enabling reliable and secure offload of sensor measurements in a sensor network are described. According to some embodiments, the system provide secure communication channels between sensing devices and gateway devices of a same sensor network, and allows for intermittent connectivity between the devices and/or mobility of the sensing devices and the gateway devices while minimizing data loss.

Figure 1:
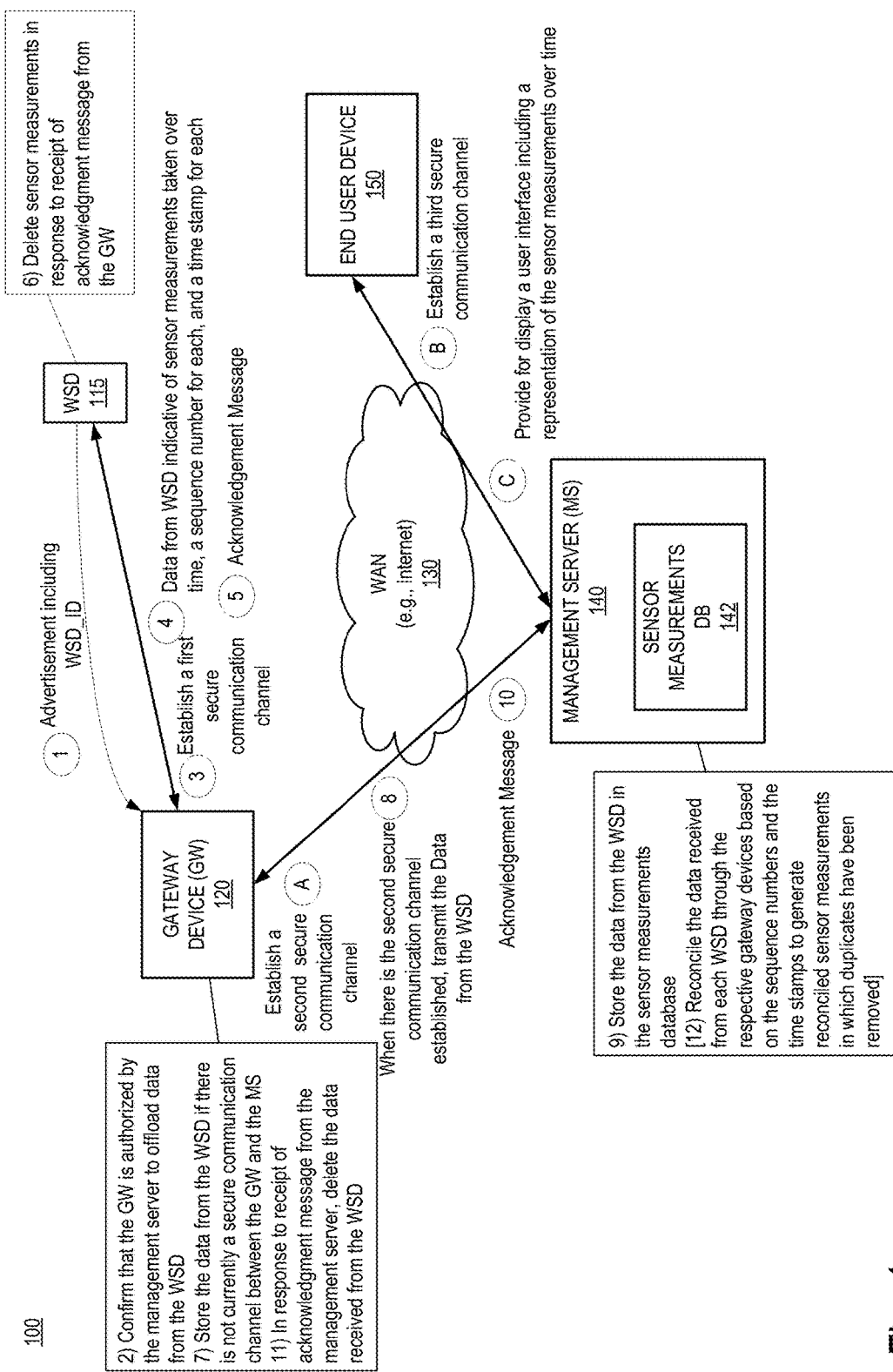
FIG. 1 illustrates a block diagram of an exemplary sensor network enabling secure and reliable offload of sensor measurements in accordance with some embodiments.

FIG. 1 illustrates a block diagram of an exemplary sensor network enabling secure and reliable offload of sensor measurements in accordance with some embodiments. The sensor network 100 includes a wireless sensing device 115, a gateway device 120, and a management server 140. The WSD 115 may be coupled to gateway device 120 through an intermittent connection as will be described below. In a similar manner, the gateway device 120 may be coupled with the management server 140 through the Wide Area Network (WAN) and may be subject to an intermittent connectivity. The management server 140 is also coupled with an end user device 150 through the 130.

The wireless sensing device (WSD) 115 is an electronic device that includes one or more sensors for detecting physical events (e.g., temperature, humidity, barometric pressure, $CO_2$ concentration, acceleration, pressure, sound, movement, etc.) and recording sensor measurements in response to the detection of these physical events. The wireless sensing device can be a small electronic device that is attachable to an object for recording sensor information related to physical events related to the object (e.g., recording changes in temperature, movement of an object (e.g., a door being closed/opened), sudden accelerations of a vehicle, etc.). The WSD 115 can then store the sensor measurements related to physical events detected over a period of time. The WSD 115 may record sensor measurements at regular intervals of time (e.g., the WSD 115 may detect the temperature of a room, or an object (e.g., refrigerator, food product), and record corresponding temperature measurements every N seconds or minutes). The sensor measurements are stored in a non-transitory computer readable medium of the WSD 115. The WSD 115 is operative to be coupled to one or more gateway devices (e.g., gateway device 120) and establish a secure communication channel to transfer the recorded sensor measurements. In some embodiments, the WSD 115 can connect to the gateway device through a short range wireless communication interface (e.g., Bluetooth LE). Thus, the WSD 115 is operative to detect a gateway device and negotiate a connection to the gateway as will be described in further details below. In some embodiments the WSD 115 is implemented as described in further details with reference to FIG. 12.

The gateway device 120 is an electronic device that is situated between the WSD 115 and the management server 140. The gateway device 120 can connect to the WSD 115 and offload sensor measurements from the WSD 115. Although not illustrated, the gateway device 120 is operative to connect with more than one wireless sensing device. Typically, the gateway device 120 will be connected in an intermittent manner with tens (or hundreds) of wireless sensing devices. The gateway device connects to the management server (e.g., 140) through a Wide Area Network (WAN 130). The connection to the WAN may be a wired (e.g., Ethernet) or a wireless (e.g., WiFi, cellular connection, etc.) connection. In some embodiments the gateway device 120 is implemented as described in further details with reference to FIG. 13. The management server 140 is a cloud based server operative to receive from one or more wireless sensing device (e.g., the WSD 115) sensor measurements through one or more gateway devices (e.g., the gateway device 120). The sensor measurements are stored in a sensor measurement database 142 and may be transmitted to the end user device 150 upon receipt of a request for the measurements. In some embodiments the management server 140 is implemented as described in further details with reference to FIG. 11.

The end user device 150 is a computing device (e.g., laptop, workstation, smartphone, palm top, mobile phone, tablet, etc.) that is capable of accessing network resources (e.g., it includes software such as web browsers or web applications that are capable of accessing network resources). A user of the end user device 150 requests access to sensor measurements recorded by the WSD 115 through a connection to a Wide Area Network (e.g., WAN 130 such as the Internet) and a client network application such as a web browser or other web application (e.g., FTP client, SSH client, Telnet client, etc.). The user of the end user device 150 can be the owner of the WSD 115, and the gateway device 120, while in other embodiments, the user is an administrator of the devices.

The system presented herein enables the secure and reliable offload of sensor measurements from the wireless sensing device 115 to the management server 140 through the gateway device 120. In an embodiment, at circle 1, the WSD 115 advertises (e.g., through the transmission of a Bluetooth LE advertisement) an identifier (WSD_ID) indicating to any gateway device within range that the WSD 115 is available for connection. The identifier may be a serial number of the WSD stored at the WSD when the device is manufactured. At operation 2, upon receipt of the advertisement, the gateway device 120 confirms that it is authorized by the management server 140 to offload data from the WSD 115. The confirmation that the gateway is authorized to offload data from the sensing device may be performed according to various embodiments. In an embodiment, the gateway device may receive from the management server 140 a list of identifiers of WSDs with which it can connect. According to this embodiment, when the gateway receives the WSD_ID, it verifies that this identifier is included in the list of authorized wireless sensing devices and establishes a connection with the WSD 115. In other embodiments, additional or different processes may be used to confirm that the gateway device is authorized to offload data from the management server. For example, the confirmation may include transmitting to the WSD 115 a certificate including a digital signature received from the management server 140, as will be described in further details with reference to FIGS. 8-9. In some embodiments, the gateway device 120 is authorized to connect and offload data from the WSD 115 when both devices belong to the same organization.

At circle 3, the gateway device 120 and the WSD 115 establish a first secure communication channel. In an exemplary embodiment, the devices may negotiate the establishment of the secure communication channel using a shared secret and an encryption protocol (e.g., Bluetooth Low Energy (BLE) Secure Connections pairing model). In an embodiment, the secret was burnt in the WSD 115 at the time of manufacture, as described in further detail below with reference to FIGS. 6A-6B. In some embodiments, the connection is performed according to a BLE pairing mechanism, where the gateway device scans for nearby sensor devices which are not yet paired to another gateway device, detects the advertisement transmitted by the WSD 115. When the secure communication is established The WSD 115 may transmit any recorded sensor measurements to the gateway device.

At circle 4, the WSD 125 transmits data indicative of sensor measurements taken over time, a sequence number and a time stamp for each one of the measurements. In an embodiment, the data includes the sensor measurements as recorded at the WSD 115 during a period of time. For example, the WSD 115 may transmit a set of temperature measurements recorded during a number of seconds, minutes, or hours. The data indicative of the measurements may include a type of the measurement (e.g., when the sensing device includes more than one sensor, the type may indicate the type of physical events detected (e.g., temperature, acceleration, orientation, humidity, sound, etc.)). The data may further include a value of the sensor measurement. In some embodiments, the data indicative of the sensor measurements may be reduced or compressed prior to being transmitted to the gateway device in order to optimize storage at the WSD 115 and bandwidth usage between the WSD 115 and the gateway device 120. In some embodiments, the data may further be transmitted with an optional boot number for each sensor measurement in addition to the time stamp and the sequence number. The boot number is a random number generated each time the WSD 115 is re-initialized.

At circle 5, an acknowledgment message is transmitted from the gateway device 120 to the wireless sensing device 115 to indicate that the data has been received. The acknowledgment instructs the WSD 115 to delete, at operation 6, the sensor measurements freeing up space on the computer readable storage medium of the WSD 115 for recording and storing additional sensor measurements. In some embodiments, the WSD 115 may continuously store sensor measurements upon detection of physical events; and deleting measurements only upon receipt of the acknowledgment message. In some embodiments the acknowledgment message transmitted at circle 5, is transmitted upon confirmation that the data is stored at the gateway device regardless of whether the data was transmitted to the management server or not. In other embodiments, the acknowledgment message is sent only once the data is transmitted to the management server and the acknowledgment message of circle 10 is received from the management server.

In one embodiment, at circle 7, the gateway device 120 stores the data from the WSD if there is not currently a secure communication channel between with the management server 140. The lack of secure communication channel between the gateway device and the management server 140 may be due to various reasons. For example, the gateway device can be in movement (e.g., the WSD 115 and the gateway device 120 are located on a moving vehicle), and may not have access to an access network for connecting to the WAN 130 (e.g., the gateway is passing through at a location not serviced with a WiFi or cellular network when it receives sensor measurements from the wireless sensing devices (e.g., through a Bluetooth LE connection)). In another example, the gateway device 120 is stationary and experiences a failure in the communication link with the management server or a failure at the gateway device following the receipt of the data. In some embodiments, the gateway device 120 may also store the data even if a secure communication channel is established with the management server.

At operation (A) the gateway device 120 and the management server 140 establish a second secure communication channel. This communication channel is an encrypted channel which may be based on a public-private key exchange protocol (e.g., Transport Layer Security (TSL), or Secure Socket Layer (SSL)). The secure communication channel is established independently of the connection between the WSD 115 and the gateway device 120. In some embodiments, the second secure communication channel is established prior to the receipt of the data at the gateway device, alternatively it is established following the receipt of the data from the WSD 115. In the example where the gateway device is mobile, the second communication channel may be established upon the gateway device getting in proximity of an access node of an access network and connecting to the WAN 130 through this access node. When the second secure communication channel is established, the gateway device 120 transmits, at circle 8, the data received from the WSD 115 to the management server 140. The data is then stored at operation 9 in a sensor measurements database 142 of the management server 140. At circle 10, the management server 140 transmits in response to the receipt of the data an acknowledgment message. At operation 11, in response to the receipt of the acknowledgment message from the management server 140, the gateway device 120 deletes the data received from the WSD 115. In some embodiments, the gateway device may send the acknowledgement of circle 5, upon receipt of the acknowledgement message from the management server 140 thus confirming to the WSD that the sensor measurements were received at the management server.

The management server 140 stores, and may process the stored data indicative of sensor measurements. For example, the management server 140 reconciles the data received from WSD 115 through the gateway device 120 (and from any other gateway device which paired with the WSD at a preceding moment (e.g., at a different location)) based on the sequence numbers and the time stamps to generate reconciled sensor measurements in which duplicates have been removed. The management server 140 may further provide, for display, at circle C a user interface including a representation of the sensor measurements over time to be provided for display on the end user device 150, following the establishment of a third secure communication channel, at operation B. In some embodiments, the representation of the sensor measurements is displayed on a web interface of a web application (e.g., web browser or a mobile web application) as discussed with reference to FIGS. 21-24, and/or 25D).

The operations in the flow diagram of FIG. 2 will be described with reference to the exemplary embodiments of FIG. 1. However, it should be understood that the operations of the flow diagram can be performed by embodiments of the invention other than those discussed with reference to FIG. 1 and the embodiments of the invention discussed with reference to FIG. 1 can perform operations different than those discussed with reference to the flow diagram.

Figure 2:
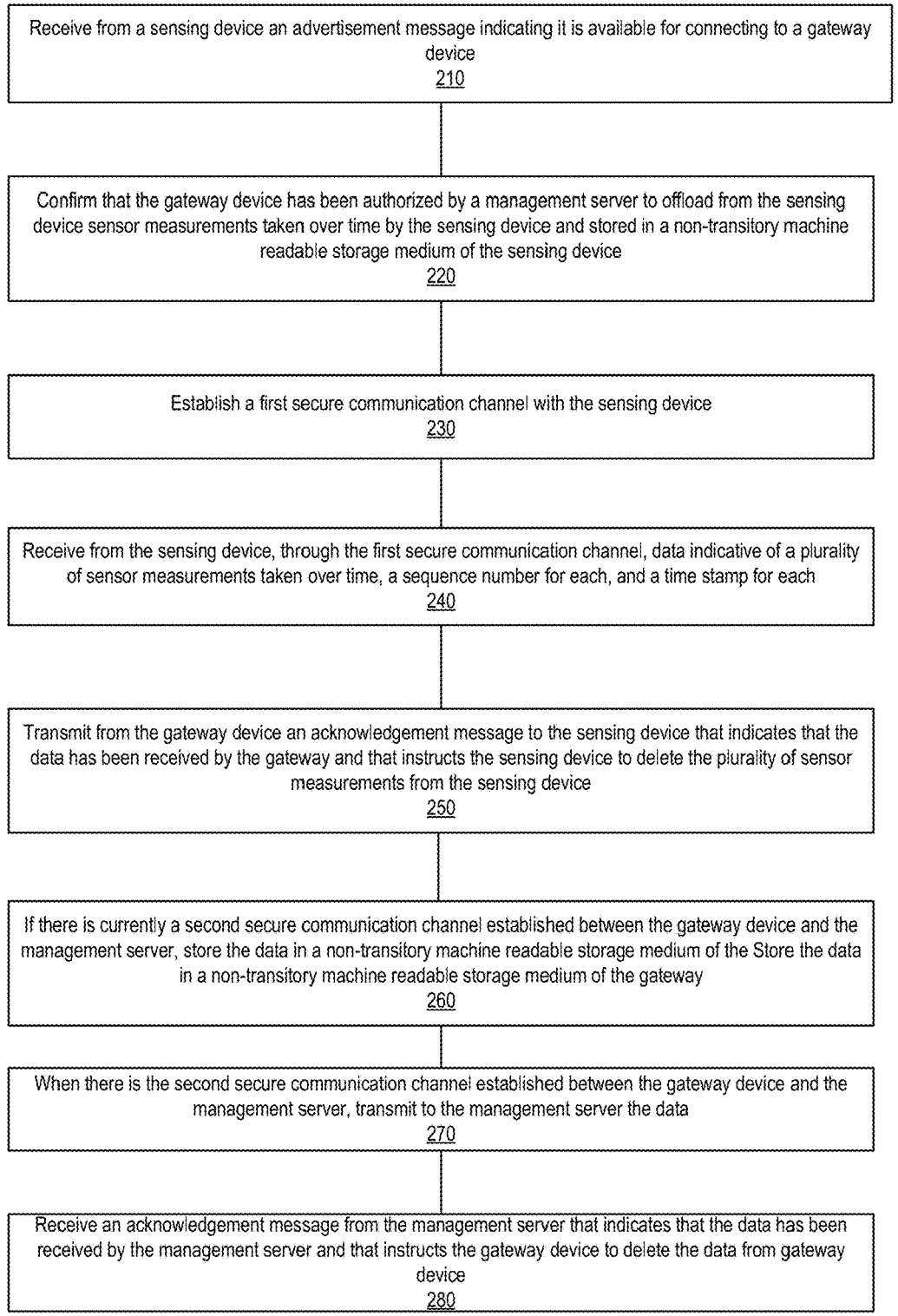
FIG. 2 illustrates a flow diagram of exemplary operations performed in a gateway device for enabling secure and reliable offload of sensor measurements from a wireless sensing device to a management server of a sensor network in accordance with some embodiments.

FIG. 2 illustrates a flow diagram of exemplary operations performed in a gateway device for enabling secure and reliable offload of sensor measurements from a wireless sensing device to a management server of a sensor network in accordance with some embodiments. The method begins at block 210 where the gateway device 120 receives from a wireless sensing device (e.g., WSD 115) an advertisement message indicating it is available for connecting to a gateway device (e.g., BLE advertisement). The flow of operations then moves to block 220 at which, the gateway device confirms that it has been authorized by a management server (e.g., 140) to offload from the wireless sensing device WSD 115 sensor measurements taken over time by the wireless sensing device and stored in a non-transitory machine readable storage medium of the wireless sensing device (e.g., the gateway device may confirm that an identifier of the WSD is included in a list of authorized WSD received from the management server). The flow then moves to block 230 at which the gateway device 120 establishes a first secure communication channel with the wireless sensing device (e.g., through a short range protocol such as Bluetooth LE). The gateway device 120, then receives, at block 240, from the wireless sensing device, through the first secure communication channel, data indicative of a plurality of sensor measurements taken over time, a sequence number for each, and a time stamp for each. The flow of operations moves to block 250 where the gateway device 120 transmits an acknowledgement message to the wireless sensing device WSD 115 that indicates that the data has been received by the gateway device and that instructs the wireless sensing device to delete the plurality of sensor measurements from the wireless sensing device. At block 260, if there is not currently a second secure communication channel established between the gateway device and the management server, the gateway network device stores the data in a non-transitory machine readable storage medium. At block 270, when there is the second secure communication channel established between the gateway device and the management server 140, the gateway device 120 transmits to the management server the data. At block 280 the gateway device 120 receives an acknowledgement message from the management server 140 that indicates that the data has been received by the management server and that instructs the gateway device to delete the data from gateway device.

The embodiments described herein enable a reliable and secure offload of sensor measurements from a wireless sensing device to a management server. The proposed embodiments, enable the wireless sensing device to securely upload sensor measurements to the gateway device through a secure communication channel establishes when the two devices are determined to be authorized to connect. The transmission of the data over the secure channel and storage of the data at the gateway device until a secure communication channel is established with the management server ensures that the data is reliably offloaded from the WSD and transmitted to the management server. The advantages of the present embodiments will be more apparent with a discussion of exemplary scenarios of mobility and intermittent connectivity between the devices with reference to FIG. 3.

Figure 3:
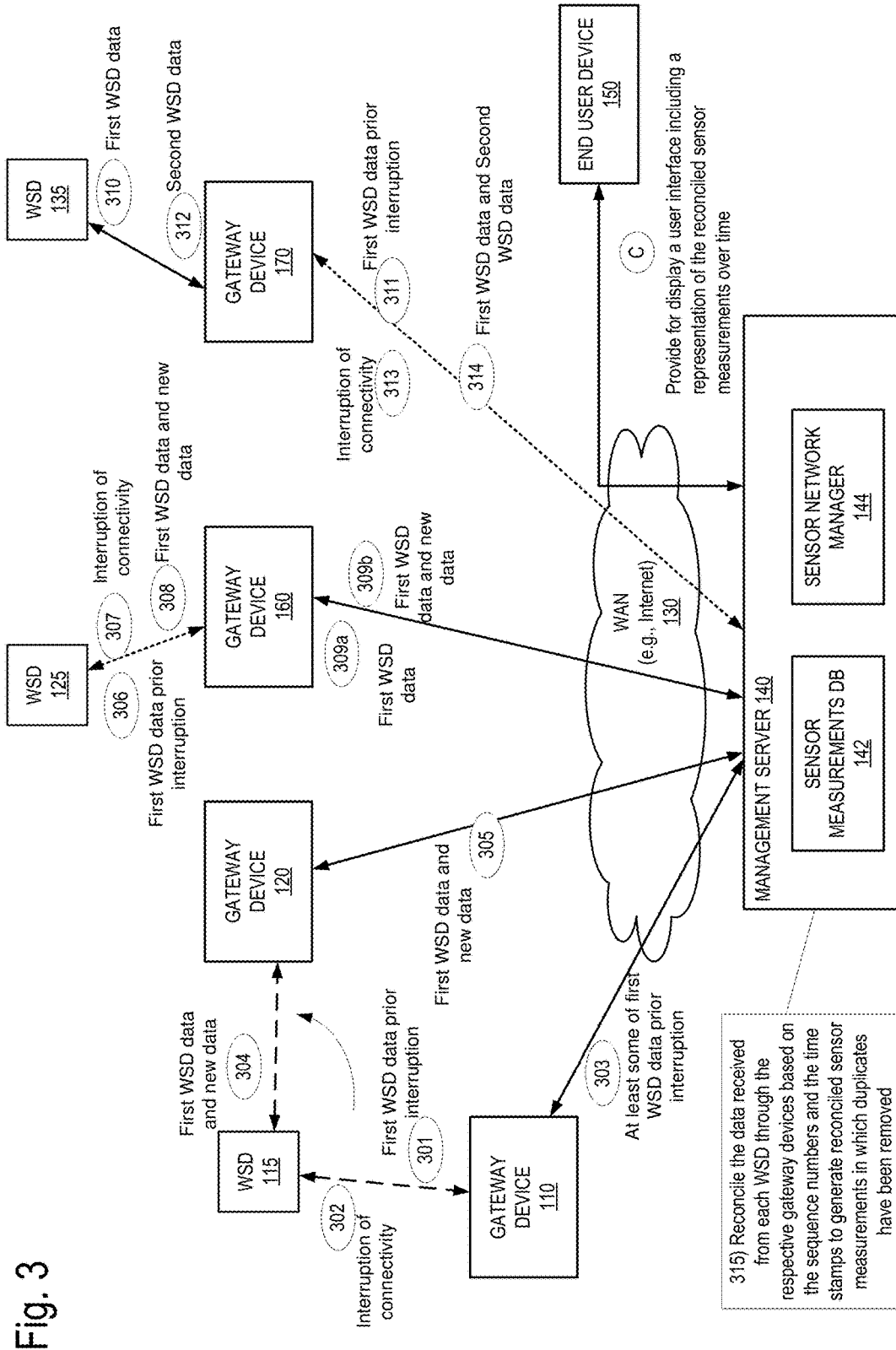
FIG. 3 illustrates a block diagram of exemplary scenarios of intermittent connectivity and mobility of devices of a sensor network in accordance with some embodiments.

FIG. 3 illustrates a block diagram of exemplary scenarios of intermittent connectivity and mobility of devices of a sensor network in accordance with some embodiments. In a first scenario, the WSD 115 establishes a first secure communication channel with the gateway device 110. In an embodiment, the first communication channel is established as discussed with respect to FIG. 1 (i.e., an advertisement message is transmitted from the WSD to the gateway device, a confirmation that the gateway device is authorized to upload data from the WSD is performed and a secure communication is established through the use of an encryption protocol). Other methods may be contemplated for establishing the secure communication channel between the gateway device 110 and the WSD 115. The WSD 115 then transmits, at circle 301, a first set of data (First WSD data).

At circle 302, an interruption of the connectivity between the wireless sensing device WSD 115 and the gateway device 110 occurs. In an embodiment, the interruption of connectivity may be due to the mobility of the wireless sensing device. For example, the WSD 115 is located at a first location (e.g., the wireless sensing device is attached to a product or a box in a warehouse, or the wireless sensing device is attached to a vehicle and recording movements of the vehicle) and is transported to another location. In another embodiment, the interruption in connectivity may be due to a failure that occurs in the communication channel between the wireless sensing device and the gateway device 110 (e.g., a failure of a communication interface at one of the devices, a failure of the gateway device 110). Prior to the interruption, the gateway device 110 receives at least some of the first WSD data transmitted by WSD 115 and transfers, at circle 303, the received data to the management server 140. The management server 140 stores the received first WSD data received from the gateway device 110 in the sensor measurements database 142.

Following the interruption of the connectivity with the gateway device 110, the WSD 115 connects to another gateway device 120. In an embodiment this second connection is established over a secure communication channel as discussed with reference to FIG. 1 (i.e., an advertisement message is transmitted from the WSD to the gateway device, a confirmation that the gateway device is authorized to upload data from the WSD is performed and a secure communication is established through the use of an encryption protocol). At circle 304, the WSD resends the first WSD data (previously sent to the gateway device 110 at operation 301) in addition to new data (e.g., data indicative of sensor measurements recorded at the WSD 115 following the disconnection of the communication channel with the gateway device 110). The gateway device 120 receives the data and transfers it to the management server 140 at operation 305. The data transmitted from the second gateway device 120 includes at least some data that was previously sent to the management server through the gateway device 110. In some embodiments, receipt of duplicate data at the management server is due to the WSD 115 not receiving from the gateway device 110 a confirmation (e.g., acknowledgment message) that the first data was received at the gateway device and transmitted to the management server. Thus the WSD 115 does not delete the first WSD data after their transmission to the first gateway device and resends the firs WSD data to the management server through the second gateway device 120. The management server 140, stores the data received from the WSD 115 through the gateway device 120.

In a second scenario, the WSD 125 experiences an intermittent connectivity with the gateway device 160. In this scenario, the intermittent connectivity may be due to a failure of the communication channel between the WSD 125 and the gateway device 160 or to a mobility of the WSD 125 or the gateway device 160 (e.g., the WSD being momentarily out of range from the gateway device 160). In this scenario, at operation 306, a first set of data (First WSD data) is transmitted from the WSD 125 to the gateway device 160 prior to the interruption of the connectivity. At circle 307, connectivity is interrupted between the WSD 125 and the gateway device 160. The gateway device 160 receives at least some of the first WSD data transmitted by WSD 125 the prior to the interruption of the connection with the WSD 125 and transfers, at circle 309a, the received data to the management server 140. The management server 140 stores the first WSD data received from the gateway device 110 in the sensor measurements database 142.

Following the interruption of the connectivity, the WSD 125 reconnects to the gateway device 160. At circle 308, the WSD resends the first WSD data (previously sent to the gateway device 160 at operation 306) in addition to new data (e.g., data indicative of sensor measurements recorded at the WSD 125 following the disconnection of the communication channel with the gateway device 160). The gateway device 160 receives the data and transfers it to the management server 140 at operation 309b. The data transmitted from the gateway device 160 following the reconnection of the two devices includes at least some data that was previously sent to the management server. In some embodiments, receipt of duplicate data at the management server is due to the WSD 125 not receiving from the gateway device 160 a confirmation (e.g., acknowledgment message) that the first data was received and transmitted to the management server. Thus the WSD 125 does not delete the first WSD data after their transmission to the first gateway device and resends the first data to the management server through the gateway device 160. The management server 140, stores the data received from the WSD 115 through the gateway device 160.

In a third scenario, the gateway device 170 experiences an intermittent connectivity with the management server 140. In this scenario, the intermittent connectivity may be due to a failure of the communication channel between the gateway device 170 and the management server 140 (the failure may occur at any link/node in the path between the gateway device and the management server) or to a mobility of the gateway device 170. The WSD 135 transmits at operation 310 first data indicative of sensor measurements recorded during a first period of time. The data is transmitted from the gateway device 170 to the management server 140 at operation 311. At operation 312 the WSD transmits second data indicative of a second set of sensor measurements to the gateway device 170. At circle 312, the gateway device 170 transmits to the management server at least some of the first WSD data received from the WSD 135 prior to the interruption of the connectivity. At circle 313, connectivity is interrupted between the WSD 135 and the gateway device 170. The management server 140 stores the first WSD data received from the gateway device 170 in the sensor measurements database 142.

Following the interruption of the connectivity, the gateway device 170 reconnects to the management server 140. At circle 314, the gateway device 170 resends the first WSD data (previously sent to the management server 140 at operation 311) in addition to the second WSD data received from the WSD at operation 312. The data transmitted from the gateway device 170 following its reconnection to the WAN includes at least some data that was previously sent to the management server 140. In some embodiments, receipt of duplicate data at the management server is due to the gateway device 170 not receiving from the management server 140 a confirmation (e.g., acknowledgment message) that the first data was received. Thus the gateway device 170 does not delete the data after their transmission to the management server and resends them when the communication channel is reestablished with the management server. The management server 140, stores the data received from the gateway device 170.

Referring back to the first scenario, duplicate data may be received at the management server when the WSD 115 was first connected to the gateway device 110 and moved resulting in a disconnection with the gateway device 110 and a connection to the gateway device 120. Similarly in the second and third scenario, duplicate data may be received at the management server either due to an intermittent connectivity between WSD and a gateway device or to an intermittent connectivity between a gateway device and the WAN that couples the gateway device to the management server. At operation 315 the management server 140 reconciles the data received from each WSD through respective gateway devices based on the sequence numbers and the time stamps associated with each sensor measurement to generate reconciled sensor measurements in which duplicates have been removed.

In one embodiment, the sequence numbers are used by the management server 140 to order for each WSD the data received from one or more gateway devices (e.g., in the first scenario, the management server orders the data received from the WSD 115 through the gateway device 110 and the gateway device 120). The management server 140 removes any duplicates by removing data with repeating sequence numbers. The time stamps are used to verify that all duplicates have been removed. In some embodiments the data is further transmitted with a boot number. The boot number is a random number generated each time a WSD is reinitialized (e.g., following a failure of the WSD, or a controlled reboot of the WSD). Thus when a WSD is reinitialized and if the sequence numbers are reinitialized, the boot number enables sensor measurements with identical sequence numbers (e.g., sensor measurements recorded prior to the re-initialization and sensor measurements recorded following the re-initialization) to be distinguished from one another using the boot number which will be different for each sequence of numbers. The boot number is then used by the management server to confirm that no "false" duplicates were removed by verifying that any duplicate data not only have identical sequence numbers but also have a same boot number. The management server 140 may further provide, for display, at circle C a user interface including a representation of the sensor measurements over time to be provided for display on an end user device (e.g., end user device 150). In some embodiments, the representation of the sensor measurements is displayed on a web interface of a web application (e.g., web browser or a mobile web application) as discussed with reference to FIGS. 21-24, and/or 25D).

FIG. 4 illustrates a block diagram of exemplary operations for enabling secure and reliable offload of sensor measurements in intermittent connectivity or mobility of a wireless sensing device in accordance with some embodiments. At operation 401 the WSD 115 transmits first data indicative of a first set of sensor measurements taken over time, where the data includes a sequence number and a time stamp for each sensor measurement. The sequence numbers and the time stamps are generated by the WSD 115 when the sensor measurements are recorded in response to detection of physical events. In an embodiment, the gateway device 110 receives all or at least some of the data transmitted by the WSD. At operation 403, the gateway device 110 may transmit the data received to the management server 140 without storing the data. Alternatively the gateway device 110 may store the data, at operation 402, prior to transmitting it to the management server. Upon receipt of the data the gateway device 110 may transmit a first acknowledgment message at operation 404. An interruption in the connectivity between the WSD 115 and the gateway device 110 may occur at any moment prior to the WSD 115 receiving the acknowledgment message. In an embodiment, the interruption occurs before the WSD 115 has completed transmitting all of the first data indicative of the first set of sensor measurements. Alternatively the interruption occurs following the receipt at the gateway device 110 of all the data but prior to the receipt of the first acknowledgment message at the WSD 115.

Flow then moves to block 405 at which the WSD 115 sends to the gateway device 120, following the establishment of a secure communication channel between the two devices, second data indicative of a second set of sensor measurements taken over time, where the data includes a sequence number and a time stamp for each sensor measurement. The sequence numbers and the time stamps are generated by the WSD 115 when the sensor measurements are recorded in response to detection of physical events. The second data is transmitted at operation 407 to the management server 140. In an embodiment, at operation 406 the second data may be stored at the gateway device 120 prior to being transmitted to the management server 140. At operation 408 the gateway device 120 sends a second acknowledgement message to the WSD 115 indicative of the receipt of the second data and instructing the WSD 115 to delete (operation 409) sensor measurements stored at the WSD 115. In an embodiment, the wireless sensing device does not delete any data prior to receiving from a gateway device a confirmation that the data is received preventing loss of recorded data. The second data may include some of the first data transmitted by the WSD 115, which causes the management server to receive duplicate data from the gateway devices 110 and 120.

At operation 410 the management server 140 sends an acknowledgement message to the gateway device 110 indicative of the receipt of the first data and instructing the gateway device 110 to delete (operation 413) the first data indicative of the first set of sensor measurements when the data is stored at the gateway device 110. Similarly, at operation 411 the management server 140 sends an acknowledgement message to the gateway device 120 indicative of the receipt of the second data and instructing the gateway device 120 to delete (operation 414) the second data representative of the second sensor measurements when the second data is stored at the gateway device 120. At operation 415, the management server 140 reconciles the data indicative of the first set of sensor measurements and the data indicative of the second set of sensor measurements based on the sequence numbers and the time stamps to generate reconciled sensor measurements in which duplicates have been removed.

In one embodiment, the sequence numbers are used by the management server 140 to order the data received from WSD 115 through the gateway device 110 and 120. The management server 140 removes any duplicates by removing data with repeating sequence numbers. The time stamps are used to verify that all duplicate have been removed. In some embodiments the data is further transmitted with a boot number. The boot number is a random number generated each time a WSD is reinitialized (e.g., following a failure of the WSD, or a controlled reboot of the WSD). Thus when a WSD is reinitialized and if the sequence numbers are reinitialized, the boot number enables sensor measurements with identical sequence numbers (e.g., sensor measurements recorded prior to the re-initialization and sensor measurements recorded following the re-initialization) to be distinguished from one another using the boot numbers which will be different for each sequence of numbers. The boot number is then used by the management server to confirm that no "false" duplicates were removed by verifying that any duplicate data not only have identical sequence numbers but also have a same boot number. The reconciliation of the data by the management server enables a user to obtain an accurate view of the events detected by the sensor over a period of time. Since the sensor measurements are not deleted prior to their receipt at the gateway device or alternatively prior to their receipt to the management server, the sensor network ensures that all data transmitted by the sensing device is available to be presented to the user. Further the embodiments described above show that the system is resilient to the mobility of the WSDs and mobility of the gateway devices, in addition to being resilient to any intermittent connectivity between the gateway device and the WSD or the gateway device and the management server.

The operations in the flow diagram of FIG. 5 will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

FIG. 5 illustrates a flow diagram of operations performed in a management server of a sensor network in accordance with some embodiments. At operation 502 the management server 140 receives, upon establishment of a first secure communication channel between a first gateway device of a plurality of gateway devices and the management server, data indicative of a first plurality of sensor measurements taken over time, a sequence number for each, and a time stamp for each. The data was transmitted to the first gateway device from a first wireless sensing device of the plurality of wireless sensing devices over a second secure communication channel between the first gateway device and the first wireless sensing device. In an embodiment, the management server 140 tracks which of the plurality of gateway devices and which of the plurality of wireless sensing devices is associated with which of a plurality of organizations, as will be described in further details with reference to FIGS. 7A-B. At operation 504, the management server 140 receives, upon establishment of a third secure communication channel between a second gateway device of the plurality of gateway devices and the management server, data indicative of a second plurality of sensor measurements taken over time, a sequence number for each, and a time stamp for each. The data was transmitted to the second gateway device from the wireless sensing device through a fourth secure communication channel between the second gateway device and the wireless sensing device following disconnection of the second secure communication channel between the first gateway device and the wireless sensing device. At operation 506, the management server 140 reconciles the data indicative of the first plurality of sensor measurements and the data indicative of the second plurality of sensor measurements based on the sequence numbers and the time stamps to generate reconciled sensor measurements in which duplicates have been removed. At operation 508, the management server 140 provides for display a user interface including a representation of the reconciled sensor measurements over time. In an embodiment the sensor measurements may be displayed as illustrated with reference to the exemplary embodiments of FIGS. 21, 22, 23, and 24.

Claiming of the WSDs and the Gateway Devices

Each device (gateway device or WSD) stores information used to enable secure and reliable offload of data from the wireless sensing devices to the management server and to provide a cloud based service for the user of the wireless sensing devices. In an embodiment, the information is configured on each WSD or gateway device by coupling the device with a computing device (e.g., laptops, workstations, smartphones, palm tops, mobile phones, tablets, etc.) through a physical communication interface (e.g., JTAG interface) and copying the information from the computer device to a computer readable storage medium of the WSD or gateway device. In some embodiments the information is stored in a dedicated hardware security module which is a physical computing device that safeguards and manages digital keys for authentication of the devices and which may provide cryptographic processing.

Figures 6A, 6B:
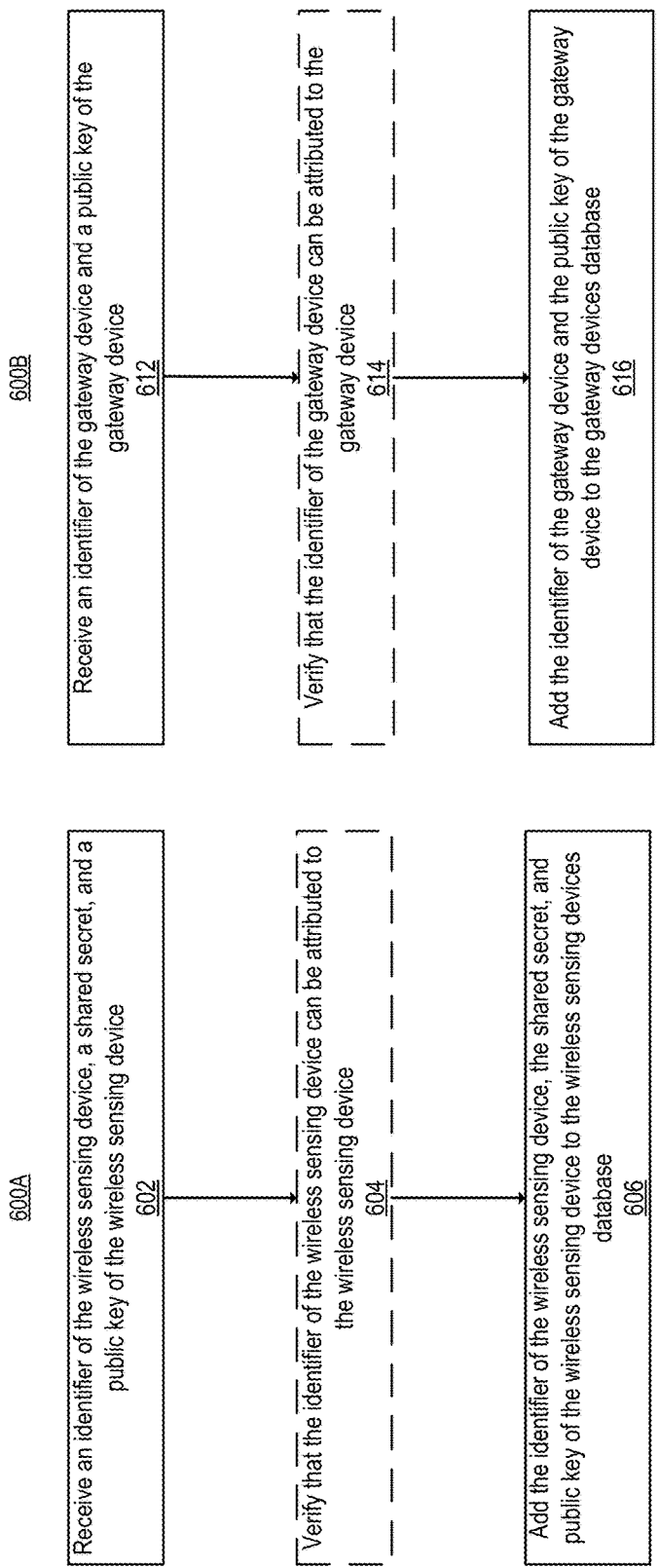
FIG. 6A illustrates a flow diagram of operations performed in a management server of a sensor network at a time of manufacture of a wireless sensing device in accordance with some embodiments.
FIG. 6B illustrates a flow diagram of operations performed in a management server of a sensor network at a time of manufacture of a gateway device in accordance with some embodiments.

In an embodiment, each wireless sensing device is configured to store an identifier (e.g., a serial number), a secret, and a public key of the management server. Optionally the wireless sensing device is further configured to store a private key of the wireless sensing device, and an associated public key. One of ordinary skill in the art would understands that in some embodiments only the private key of the wireless sensing device is stored while the corresponding public key is sent to the management server without being stored at the WSD. The information is then transmitted from the computing device performing the configuration to the management server through a secure communication channel. FIG. 6A illustrates a flow diagram of operations (600A) performed in a management server of a sensor network at a time of manufacture of a wireless sensing device in accordance with some embodiments. At operation 602 the management receives an identifier of the wireless sensing device, a secret, and a public key of the wireless sensing device. At optional operation 604, the management server may verify that the identifier of the wireless sensing device can be attributed to the wireless sensing device (e.g., by verifying that this identifier was not previously attributed to another WSD). In one embodiment the operation 604 is skipped and flow moves to block 606 where the management server 140 adds the identifier of the wireless sensing device, the secret, and public key of the wireless sensing device to a wireless sensing devices database (e.g., WSD database 148 of FIG. 11).

In an embodiment, each gateway device is configured to store an identifier, a public key of the management server, and a private key of the gateway device. Optionally the gateway device is further configured to store a public key associated with the private key of the gateway device. Alternatively, the public key of the gateway is not stored at the gateway device it is directly transmitted to the management server 140. The information is then transmitted from the computing device performing the configuration to the management server through a secure communication channel. FIG. 6B illustrates a flow diagram of operations (600B) performed in a management server of a sensor network at a time of manufacture of a gateway device in accordance with some embodiments. At operation 612, the management server 140 receives the identifier of the gateway device and the public key of the gateway device. At optional operation 614, the management server 140 may verify that the identifier of the gateway device can be attributed to the gateway device (e.g., by verifying that this identifier was not previously attributed to another gateway device). In one embodiment the operation 614 is skipped and flow moves to block 616 where the management server 140 adds the identifier of the gateway device and the public key of the gateway device to a gateway devices database (e.g., gateway devices database 146 of FIG. 11).

Figure 14:
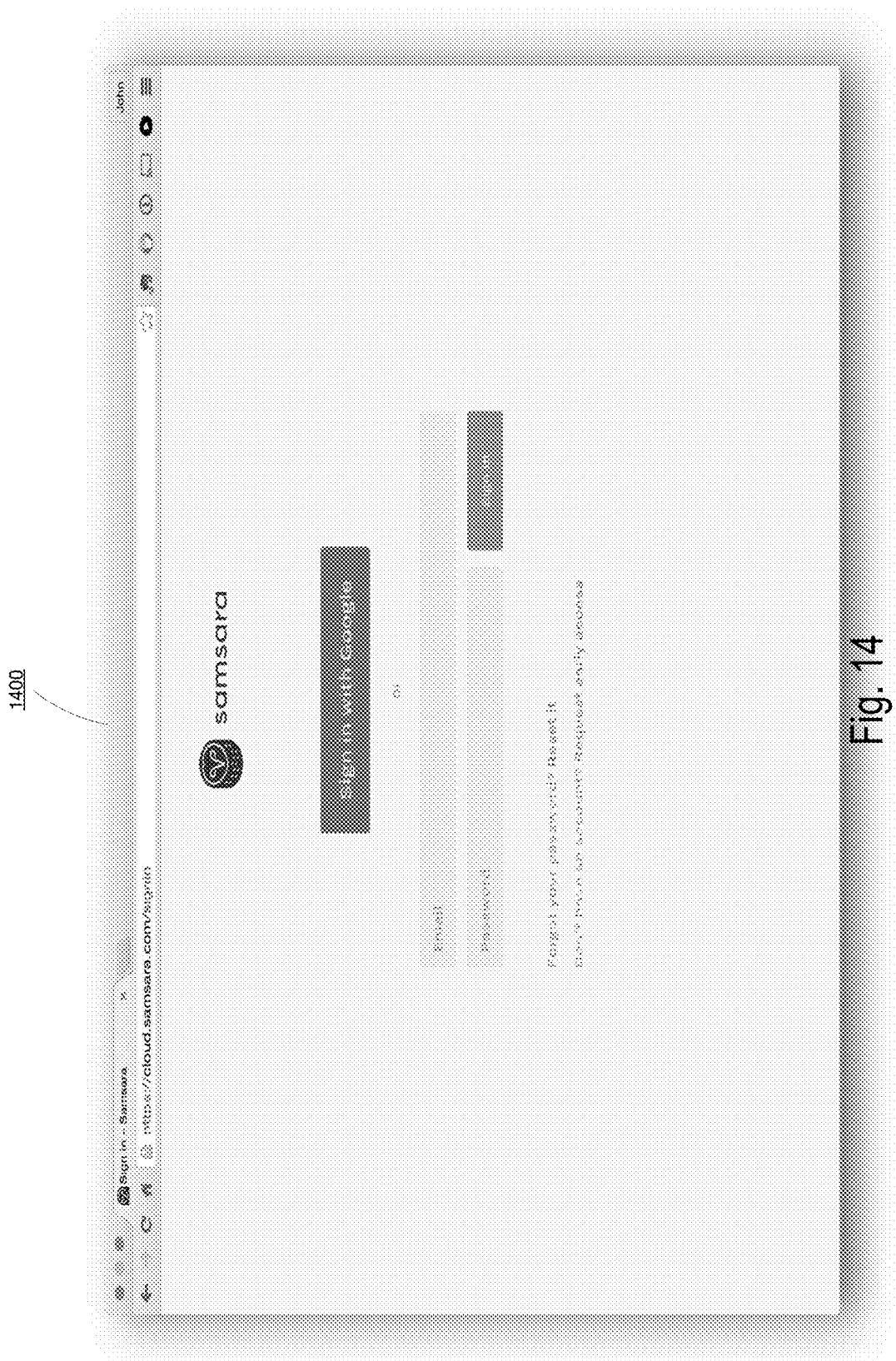
FIG. 14 illustrates an exemplary login screen for enabling a user of an organization to access their account at the sensor network service in accordance with some embodiments.
Figure 15:
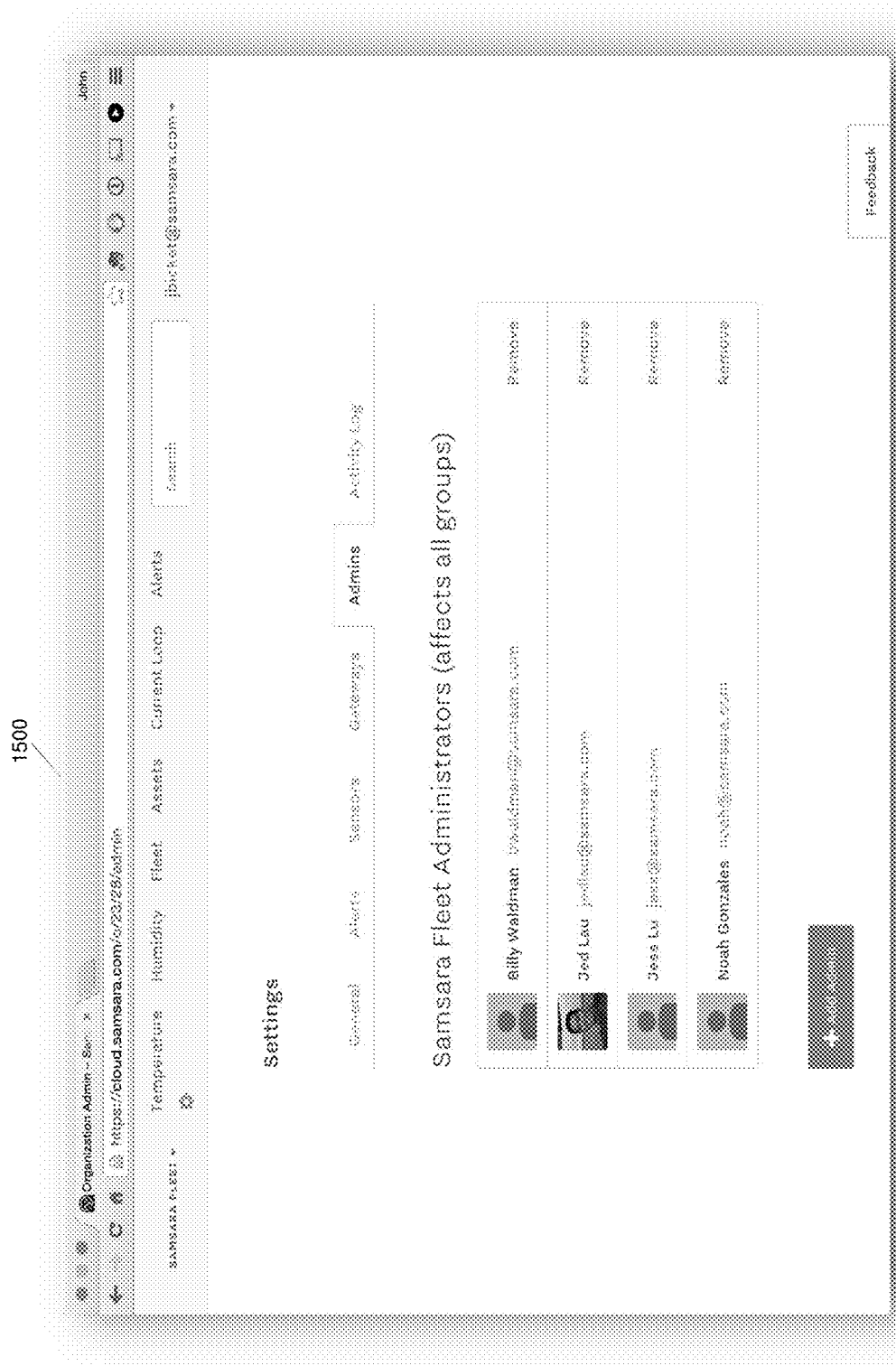
FIGS. 15-16 illustrates an exemplary input form for enabling an administrator to be added to a list of authorized users of the sensor network service in accordance with some embodiments.

In some embodiments, the wireless sensing devices and gateway devices are associated with an organization from a plurality of organizations. For example, an organization may be a customer of a cloud based sensor network service. The cloud based sensor network service (which includes services performed by the management server) may provide an account for the organization, where the organization can include an individual user or a plurality of users. In some embodiments, the account may be accessible via a web based user interface (web page) 1400 of FIG. 14. A user (e.g., an account administrator) can log-in to the organization's account with a username (e.g., email address, name, etc.) and a password. In some embodiments, the user may log-in using a pre-established user account of another service (e.g., Google account, etc.). In some embodiments, when a user does not yet have an account, they may request the creation of an account via the web page 1400. When the user has logged in and accessed the account, they may add users and/or remove users to/from the account, view data and information regarding the devices already associated with this account, and/or add devices to the account. FIGS.

Figure 16:
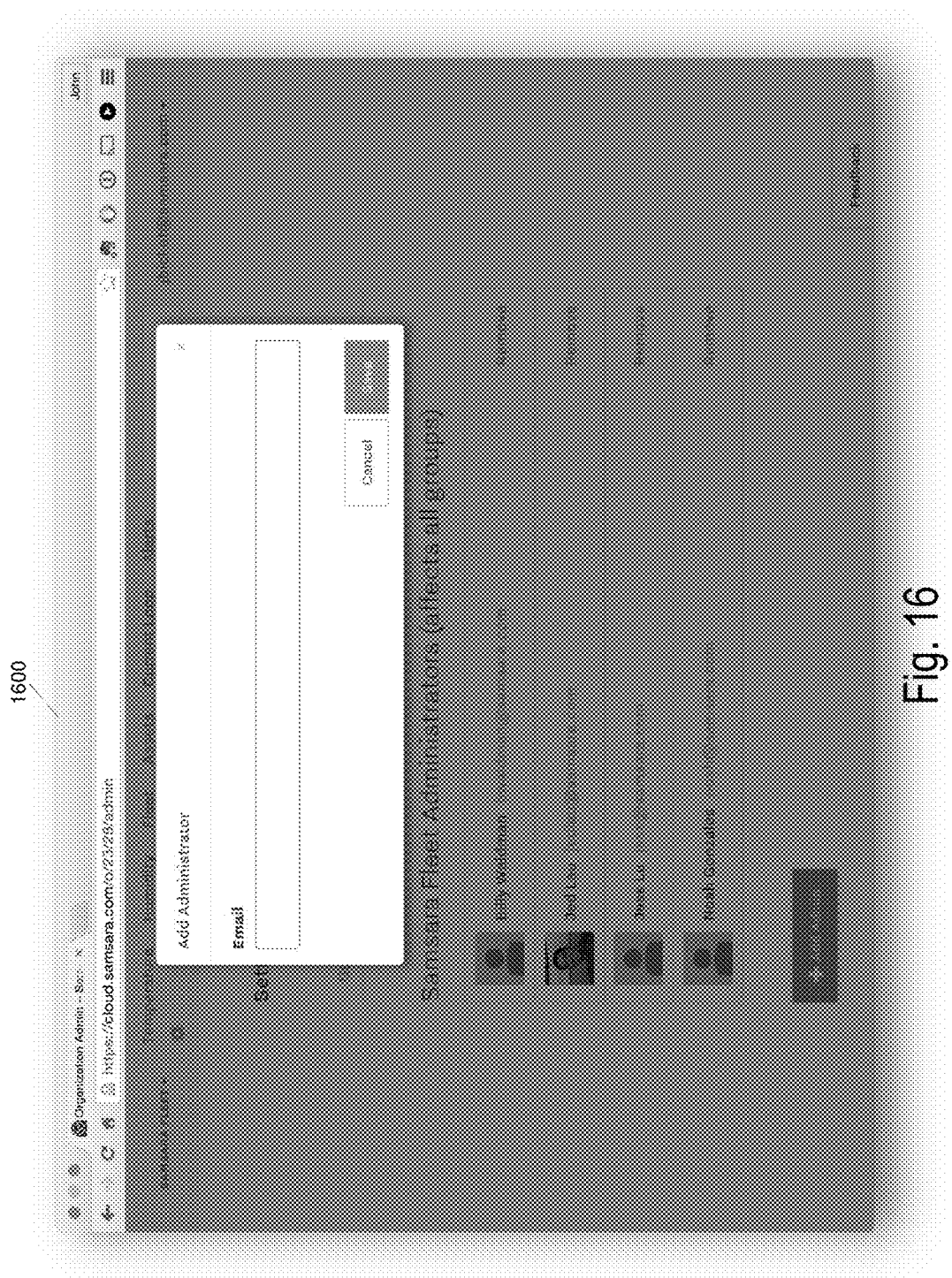

15-16 illustrate an exemplary input form for enabling an administrator to be added to a list of authorized users of the sensor network service associated with an organization in accordance with some embodiments. For example, as illustrated at web page 1500, the user may access an "Admins" tab, which displays a list of the users authorized to access the organization's account. At FIG. 16, a user may add a user by entering an email address (or another identifier for the user: username, phone number, etc.).

Figure 17:
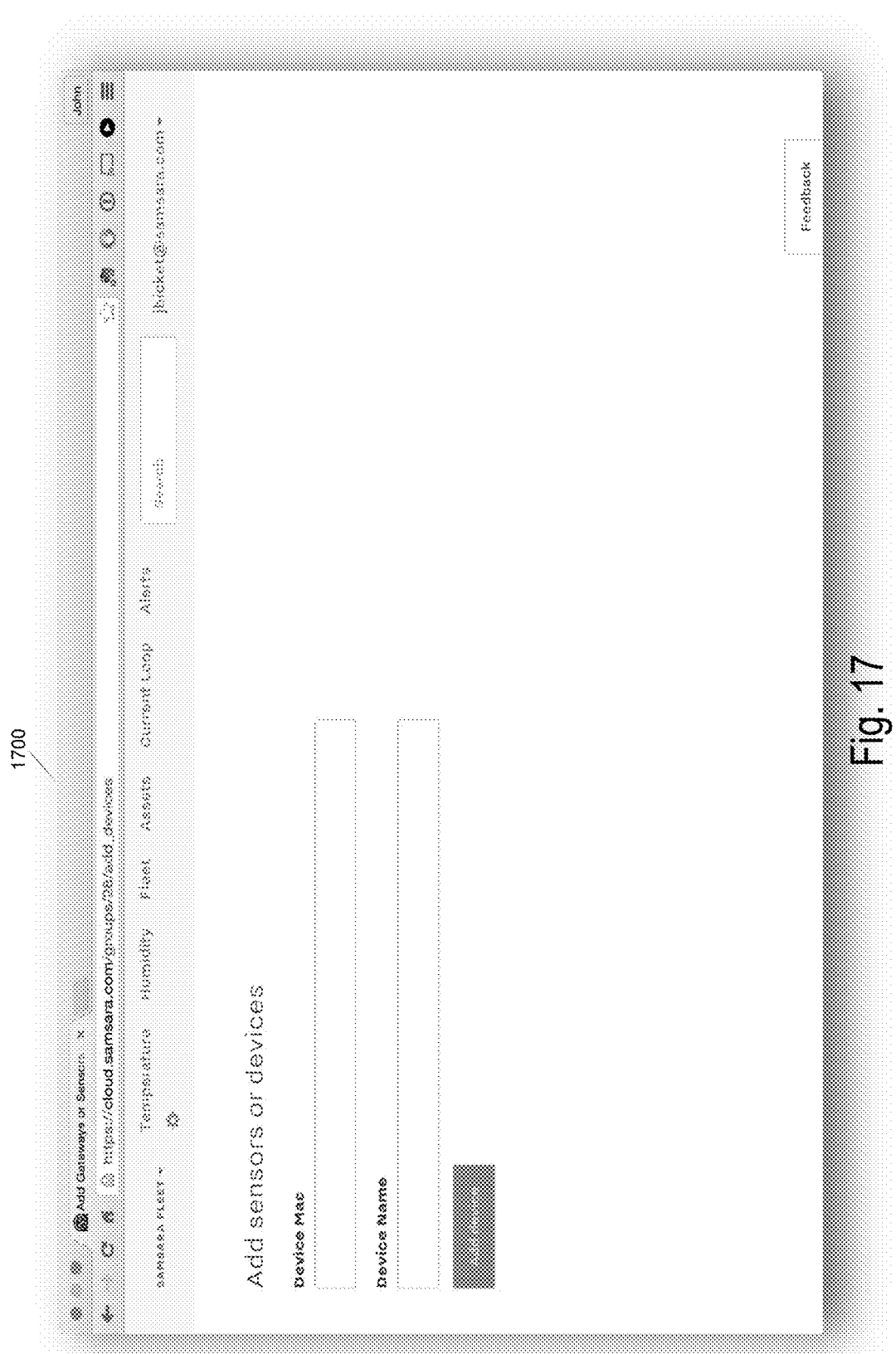
FIG. 17 illustrates an exemplary input form for adding a device to an organization of a sensor network service in accordance with some embodiments.

In order to be associated with an organization, each one of a set of wireless sensing devices or gateway devices is claimed by the organization. An organization may claim a device by transmitting to the management server an indication that the device is to be associated with the organization. FIG. 7A illustrates a flow diagram of operations (700A) performed in a management server of a sensor network when wireless sensing devices are claimed by an organization in accordance with some embodiments. At operation 702, the management server receives an indication that a set of one or more of the wireless sensing devices is to be associated with an organization. For example, identifiers of the WSDs may be entered through a user interface (e.g., uploading a file including the set of one or more identifiers of the WSDs, or a user manually entering the identifier of each of the WSDs using the user interface). For example, the web page 1700 of FIG. 17 may be used to enter an identifier of a device (e.g., Media Access Control (MAC) address) and name for the device.

Figure 25A:
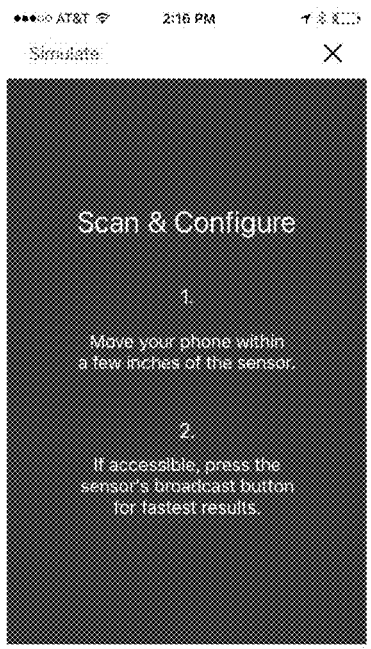
FIGS. 25A-25D illustrate exemplary user interface for adding a wireless sensing device to an organization of a sensor network service in accordance with some embodiments.
Figure 25B:
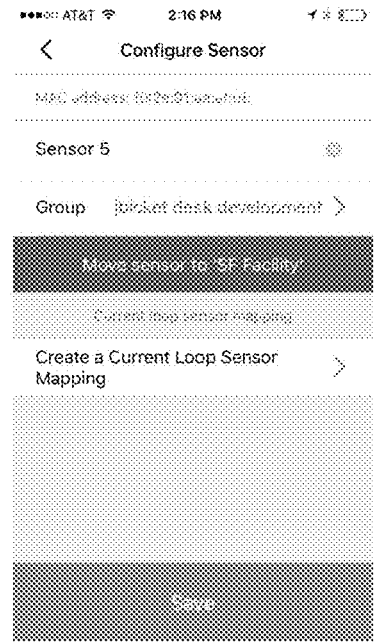
Figure 25C:
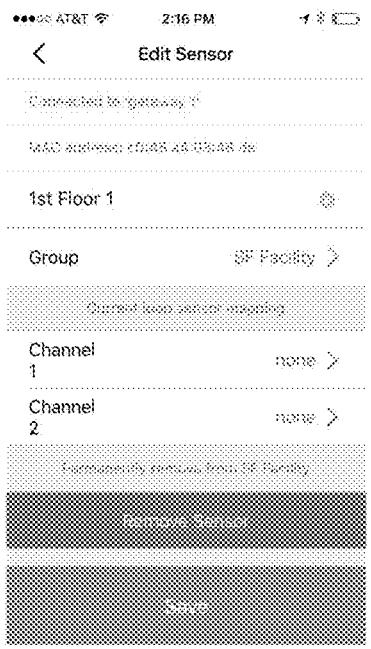
Figure 25D:

In an embodiment, the identifier of the device may be received from an intermediary computing device (e.g., laptop, smartphone, tablet, etc.) which was momentarily coupled with each of the WSDs and received from the WSD an advertisement message including the identifier. In some embodiments, the computing device may include a software application operative to detect an advertisement including the identifier of the WSD (BLE advertisement) that is periodically broadcasted and to transmit the identifier to the management server. The computing device may be used to name the WSD or configure the WSD with additional parameter. In one exemplary embodiment, the computing device is a mobile device including a mobile application for receiving an identifier of a WSD. FIGS. 25A-25D illustrate exemplary user interface for adding a wireless sensing device to an organization with a mobile application in accordance with some embodiments. As illustrated in FIG. 25A, a user interface of a mobile application may instruct a user to move their mobile electronic device (e.g., smart phone, tablet, mobile phone, etc.) close to a WSD to enable the mobile electronic device to receive the identifier of the WSD. The user is then prompted to configure the detected WSD (FIG. 25B) by adding a name, and associating the wireless sensing device with a group of devices (e.g., devices from a same group may be located within a same room, a same warehouse, a same vehicle etc.). As illustrated in FIG. 25C, the WSD may be edited (e.g., the WSD may be removed, the name can be changed, the WSD can be associated with another group, etc.). When the configuration is completed, the mobile application may be used to display a list of WSDs as well as sensor measurements (e.g., current sensor measurements recorded by each device as illustrated in FIG. 25D). The user may use the mobile application to further scan for new WSDs and add the WSDs to the organization or to one of multiple groups of WSDs belonging to the organization.

Figure 20:
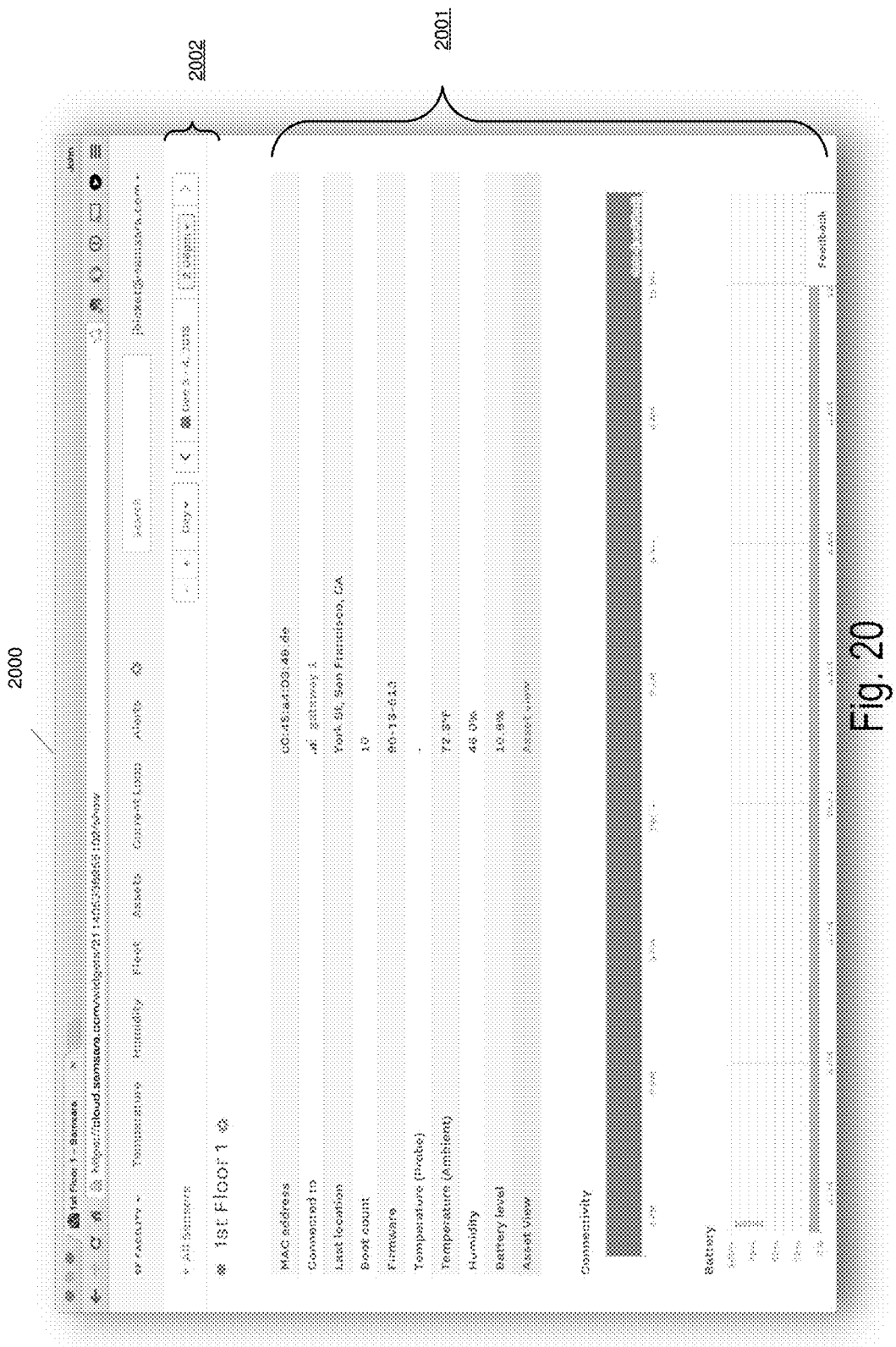
FIG. 20 illustrates exemplary information related to a wireless sensing device associated with an organization of a sensor network service in accordance with some embodiments.

Flow then moves to operation 704, where the management server 140 associates the set of one or more of the wireless sensing devices with the organization to which the device belongs. In an embodiment, the association is performed by adding an organization identifier to each entry (corresponding to the WSDs to be associated) in the WSD database (e.g., WSD database 148), and further adding to an organizations database (1150 of FIG. 11) the WSD identifiers of the WSDs being associated. The organizations database may include for each WSD associated with the organization the identifier of the WSD, the public key of the WSD, and the secret of the WSD. Once a WSD is associated with an organization, the user may access information regarding the WSD using the web user interface. FIG. 20 illustrates exemplary information related to a wireless sensing device associated with an organization displayed on the web page 2000 in accordance with some embodiments. In this example, the user may access a set of one or more information 2001 related to each WSD. The set may include the WSD's name (e.g., "1$^{st}$ Floor 1"), its MAC address, the name of the current gateway to which the WSD is connected (e.g., "gateway 1"), the last location of the WSD (e.g., York St. San Francisco), battery level, connectivity status of the device (e.g., whether the connection to the gateway device is active or not), as well as one or more sensor measurements (e.g., humidity level recorded by the WSD, the current temperature, etc.). A user may further select using the interface elements 2002 to view information of the WSD at a different date and time.

The flow then moves to operation 706, where the management server 140 transmits the wireless sensing device identifiers of the set of one or more of the wireless sensing devices to each of the gateway devices associated with the organization. In some embodiments, the management server 140 also transmits for each WSD, the secret of the WSD, and a digital certificate as described in further detail with reference for FIG. 8. The secret once shared with the gateway devices associated with the organization can be used by the WSDs and the gateway devices to negotiate and establish a secure communication channel for offloading data from the WSDs to the management server through the gateway device. Upon receipt of the data, the management server may reconcile and store the data associated with the organization in the sensor measurement database (e.g., 142) and provide users of the organization with a view of the representation of sensor measurements obtained from the WSD.

FIG. 7B illustrates a flow diagram of operations (700B) performed in a management server of a sensor network when gateway devices are claimed by an organization in accordance with some embodiments. At operation 712, the management server 140 receives an indication that a set of one or more of the gateway devices is associated with an organization from a plurality of organizations. For example, identifiers of the gateway devices may be entered through a user interface (e.g., uploading a file including the set of one or more identifiers of the gateway devices, or a user manually entering the identifier of each of the gateway devices using the user interface). For example, the web page 1700 of FIG. 17 may be used to enter an identifier of a device (e.g., Media Access Control (MAC) address) and name for the device. In an embodiment, the identifier of the device may be received from an intermediary computing device which was momentarily coupled with each of the gateway devices and received the identifiers from the gateway devices. In some embodiments, the computing device may include a software application operative to detect an advertisement including the identifier of the gateway device (e.g., BLE advertisement) that is periodically broadcasted and to transmit the identifier to the management server. The computing device may be used to name the gateway device or configure the gateway device with additional parameters.

Figure 18:
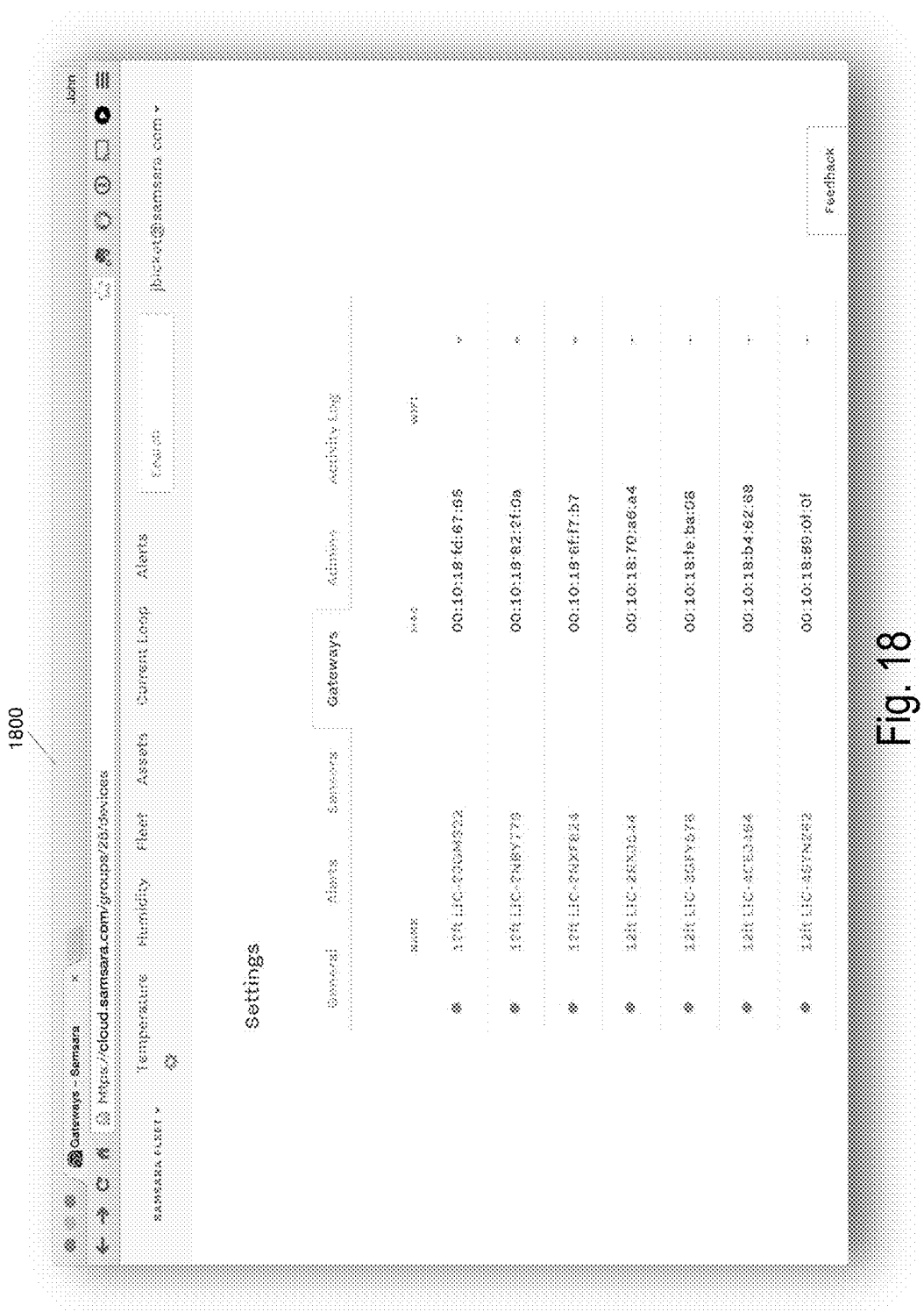
FIG. 18 illustrates an exemplary list of gateway devices associated with an organization of a sensor network service in accordance with some embodiments.
Figure 19:
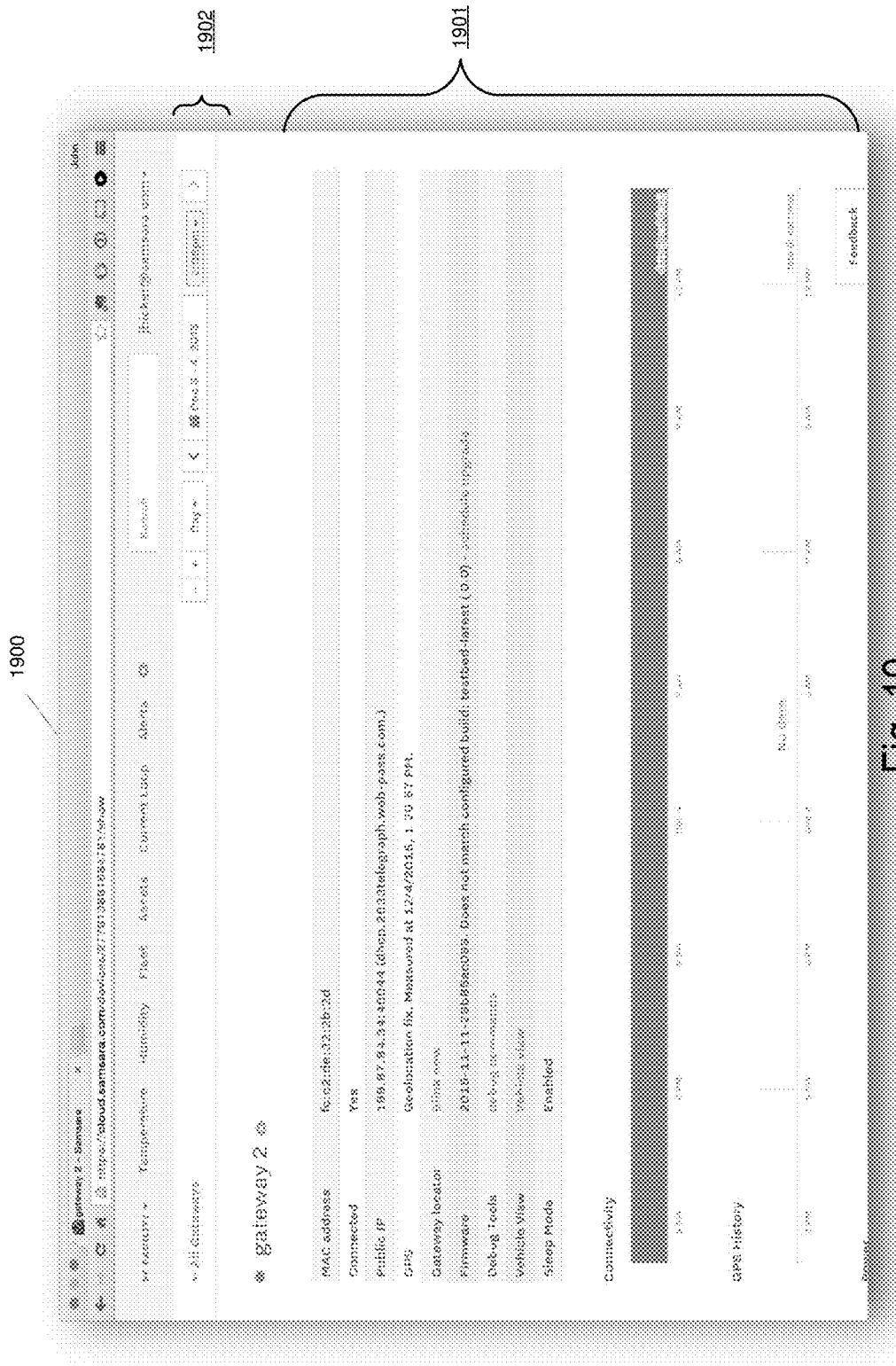
FIG. 19 illustrates exemplary information related to a gateway device associated with an organization of a sensor network service in accordance with some embodiments.

Flow then moves to operation 714, where the management server 140 associates the set of one or more of the gateway devices with the organization. In an embodiment, the association is performed by adding an organization identifier to each entry (corresponding to the gateway devices to be associated) in the gateway devices database (e.g., gateway device adding to an organizations database (1150 of FIG. 11) the gateway device identifiers of the gateway devices being associated. The organization database may include for each gateway device associated with the organization the identifier of the gateway device and the public key of the gateway device. Once one or more gateway devices are associated with an organization, the user may access information regarding each of the gateway devices using the web user interface. FIG. 18 illustrates an exemplary list of gateway devices associated with an organization displayed on a web page 1800 in accordance with some embodiments. In this example, each gateway is associated with a name (e.g., "12ft LIC-2JGM322") and a MAC address. The user may select one of the gateway devices to view additional information related to the gateway device. FIG. 19 illustrates exemplary information related to a gateway device associated with an organization in accordance with some embodiments. In this example, the user may access a set of one or more information 1901 related to the gateway device as displayed on a web page 1900. The set may include the gateway's name (e.g., "gateway 2"), its MAC address, the last location of the gateway (e.g., GPS location), connectivity status of the device (e.g., whether the connection to a network (e.g., WAN) is active or not), the IP address of the gateway device, as well as other information or tools that may be used by the user to manage and/or debug the gateway device. A user may further select using the interface elements 1902 to view information of the gateway device at a different date and time.

The flow then moves to operation 716, where the management server 140 transmits the wireless sensing devices identifiers of all of the wireless sensing devices associated with the organization to each of the set of gateway devices associated with the organization. In some embodiments, the management server 140 also transmits for each WSD, the secret of the WSD, and a digital certificate as described in further detail with reference for FIG. 8. The secret once shared with the gateway devices associated with the organization can be used by the WSDs and the gateway devices to negotiate and establish a secure communication channel for offloading data from the WSDs to the management server through the gateway device. The certificate may be used by the gateway device to be authorized to upload data from the wireless sensing devices. The operation 116 is performed when the gateway devices have established a secure communication with the management server 140 (for example through the WAN 130).

In an embodiment, a set of WSDs and a set of gateway devices are associated with an organization. When the devices are in operation, data is offloaded to the management server 140 according to the embodiments described with reference to FIG. 1-5. A user of the organization may log-in to a web application to view the data offloaded from each WSD (via one or more gateway devices) to the management server. FIGS. 21-24 illustrate exemplary representation of data offloaded from one or more wireless sensing devices through one or more gateway devices in accordance with some embodiments.

Figure 21:
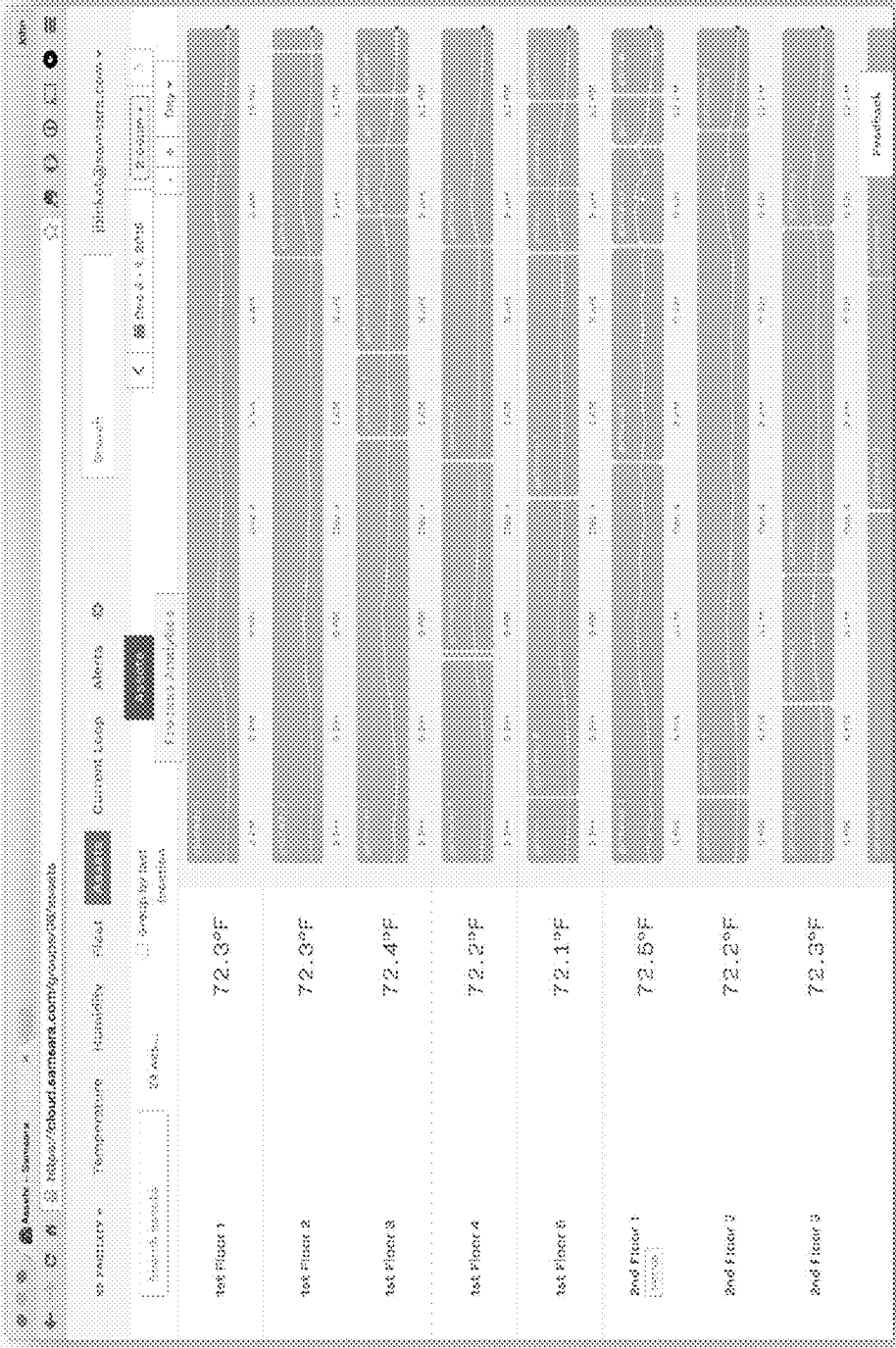
FIGS. 21-24 illustrate exemplary representation of data offloaded from one or more wireless sensing devices through one or more gateway devices of a sensor network in accordance with some embodiments.

FIG. 21 illustrates a first example of a representation of the data which is recorded at each one of a set of WSDs and transmitted to the management server via multiple gateway devices. The user may access the list of "assets" (i.e., WSDs that belong to the organization) and may view the temperature recorded at each one of the devices during an interval of time. For example, a first WSD "$1^{st}$ Floor" has continuously recorded and offloaded data through "gateway 1" to the management server. Alternatively, a second WSD "$2^{nd}$ Floor 1" has continuously recorded and transmitted data to the management server first via "gateway 2" between 3 PM and 3 AM, then via "gateway 1" between 3 AM and 6 AM. In this example, the WSD "$2^{nd}$ Floor 1" is then connected to a first gateway during a first period of time then to a second gateway during a second period of time. The disconnection of the WSD from the first gateway may be due to the mobility of the gateway or to an interruption of the connection between the device and the gateway causing the WSD to connect to the second gateway device. In this example, despite a change in the connectivity of the WSD (from gateway 1 to gateway 2) the management server receives the data recorded at the WSD during the uninterrupted period 3 PM to 6 AM without experiencing a loss of data (or alternatively with a minimal loss of data). The embodiments described with reference to FIGS. 1-5 enable a user of the organization to obtain an uninterrupted view of the sensing measurements recorded at each WSD.

Figure 22:
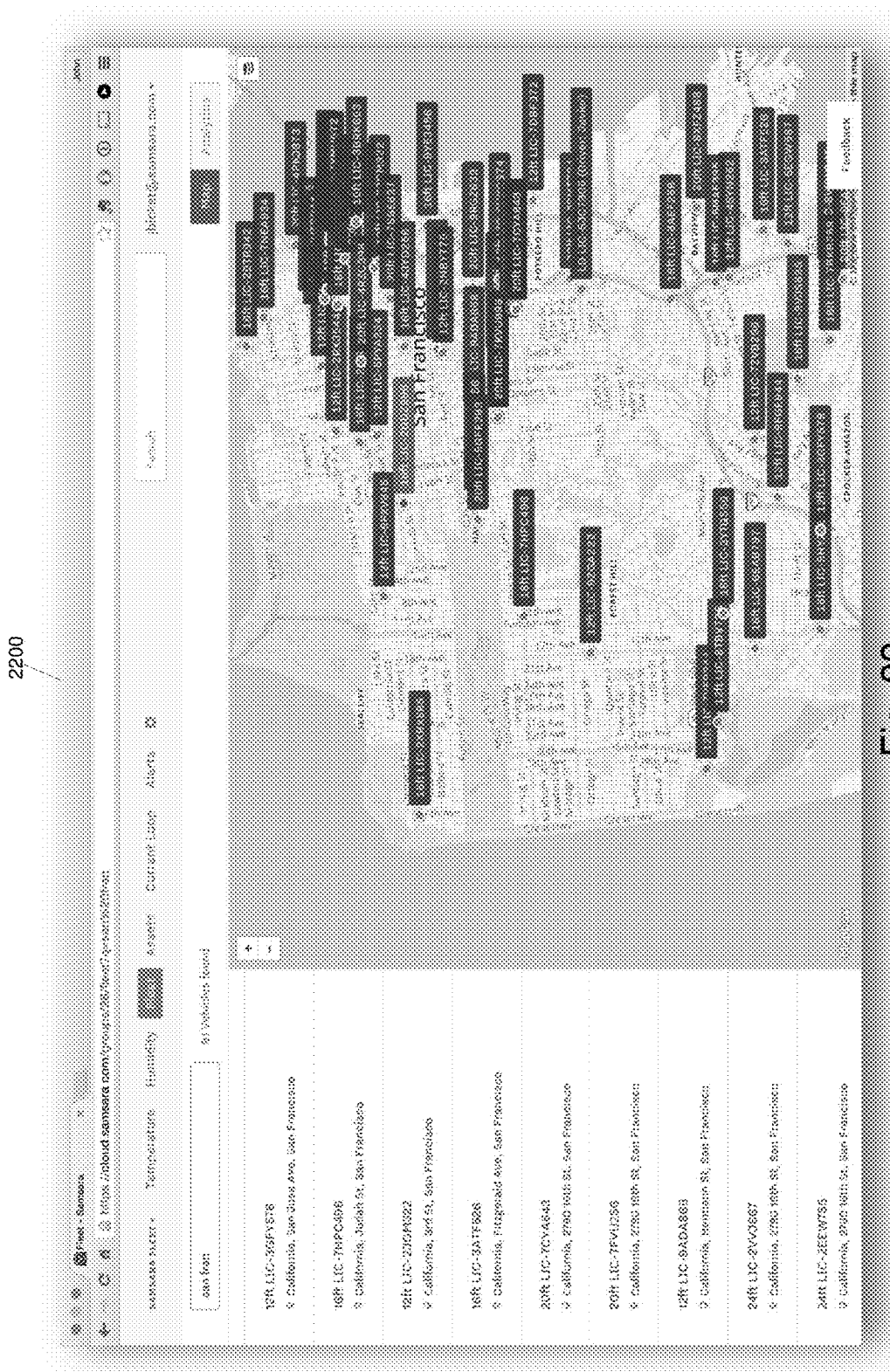

FIG. 22 illustrates an exemplary web page 2200 for displaying the locations of multiple devices of an organizations. In one embodiments, each location on the map indicates the location of a gateway device located within a vehicle of a fleet of vehicles (e.g., a vehicle transporting goods, or persons). Each vehicle may further include one or more wireless sensing devices coupled with the gateway device and recording sensor measurements within the vehicle (e.g., temperature, humidity of the goods, acceleration of the vehicle, speed of the vehicle etc.). The gateway device within the vehicle is used to store data indicative of the sensor measurements and to offload the data to the management sever when a connection with a WAN is established (e.g., through a WiFi connection or a cellular connection).

Figure 23:
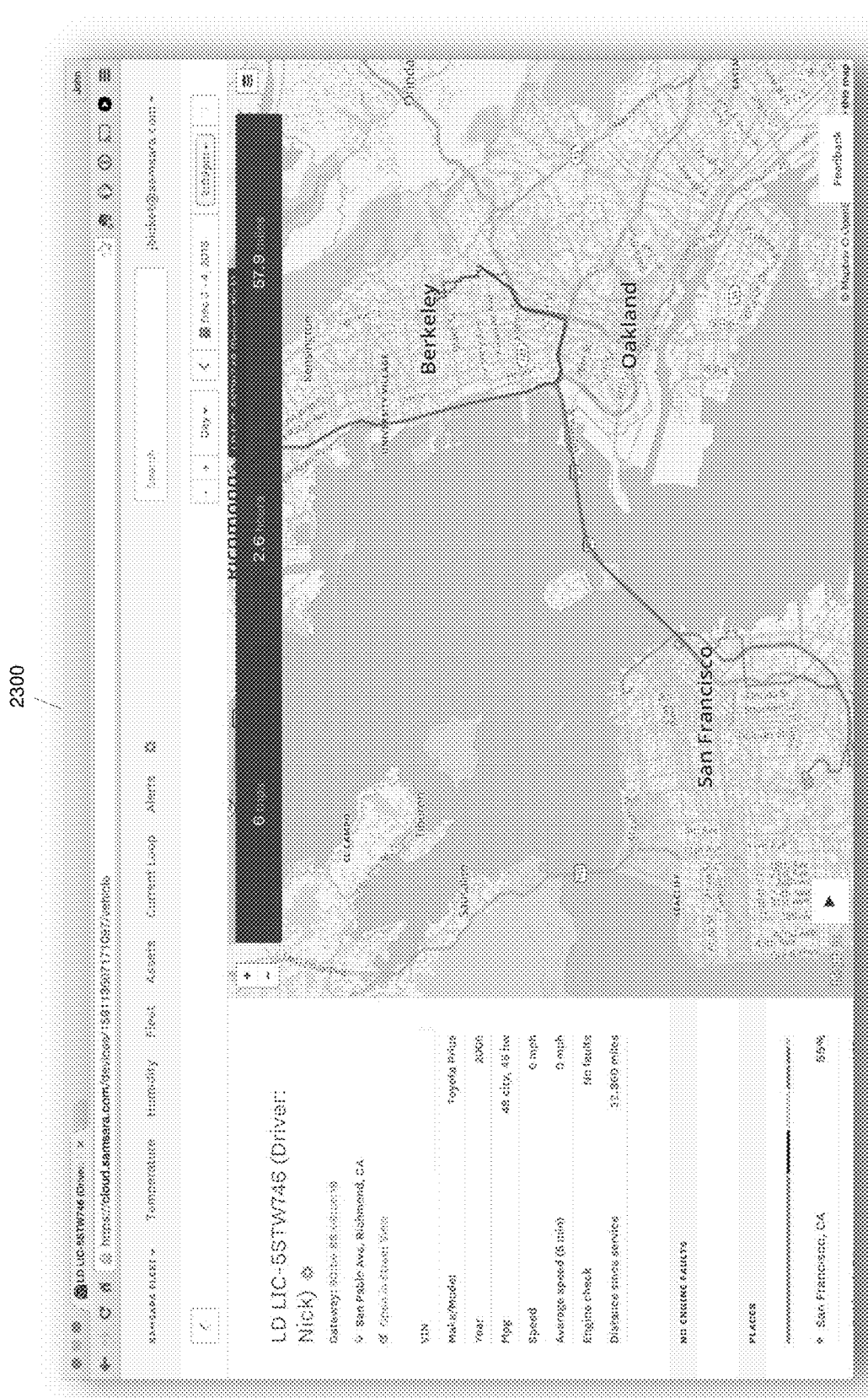

FIG. 23 illustrates an exemplary web page 2300 for displaying detail regarding the route of a particular vehicle in accordance with some embodiments. The information displayed may include a number of trips taken by the vehicle, their length, the current location of the vehicle, the current speed of the vehicle, statistics regarding the routes of the vehicle, and information regarding the vehicle (e.g., make, year, etc.).

Figure 24:
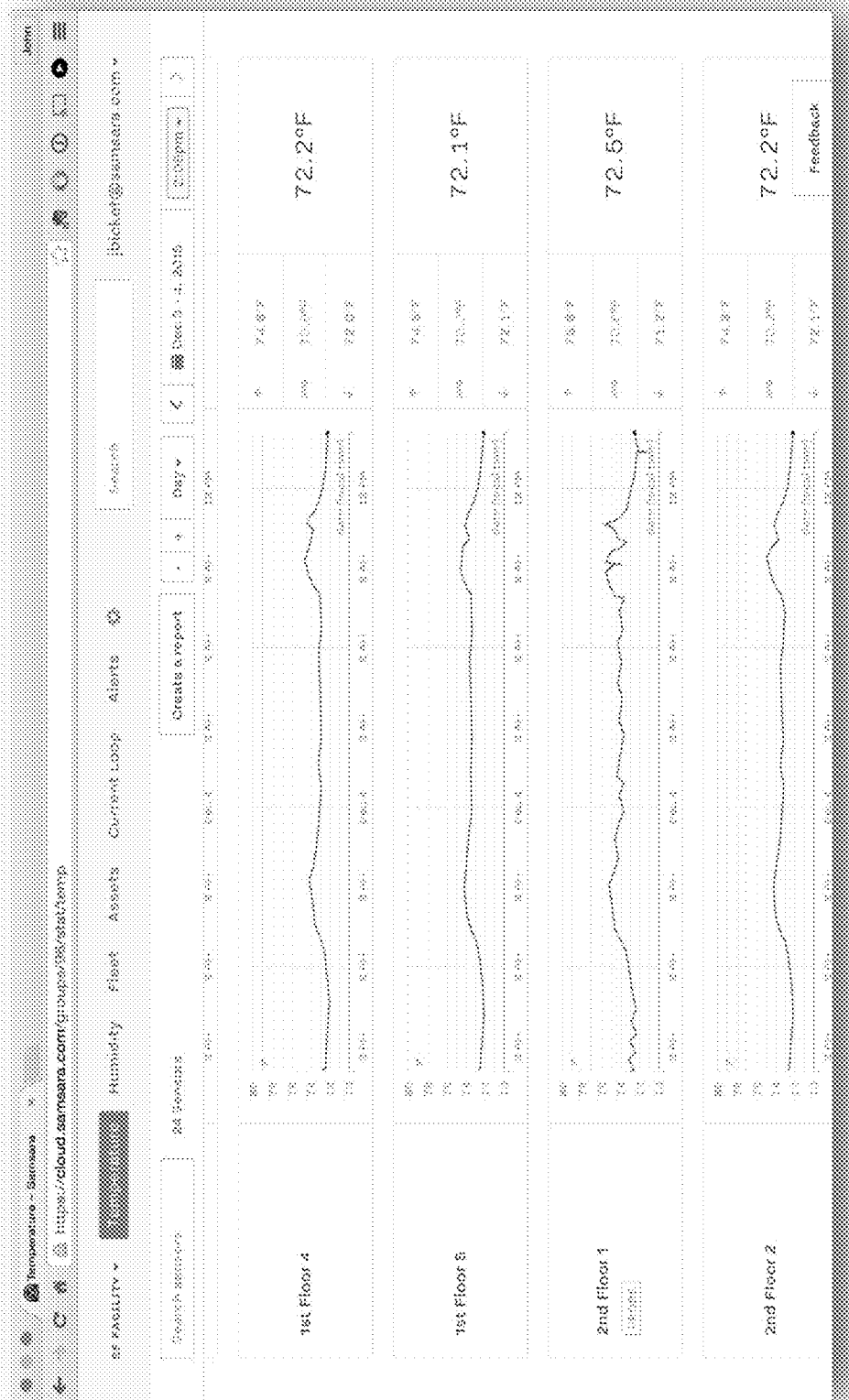

FIG. 24 illustrates an exemplary web page 2400 displaying temperature measurements recorded by multiple WSDs of an organization in accordance with some embodiments. A user may use this user interface to analyze temperature measurements recorded by each WSD over a period of time. Statistical information (e.g., lowest temperature recorded, average, highest temperature recorded, etc.) can also be displayed.

While the embodiments described with reference to FIGS. 21-24 relate to a user interface of a web application (e.g., a web page displayed on a web browser) other user interfaces may be used. For example, a user interface of a mobile application may be used to provide access to a user of an organization to the sensor network service. The user may access the sensor network service via a mobile phone, a tablet or any other mobile electronic device.

Authentication/Authorization of the Gateway Device

Figure 8:
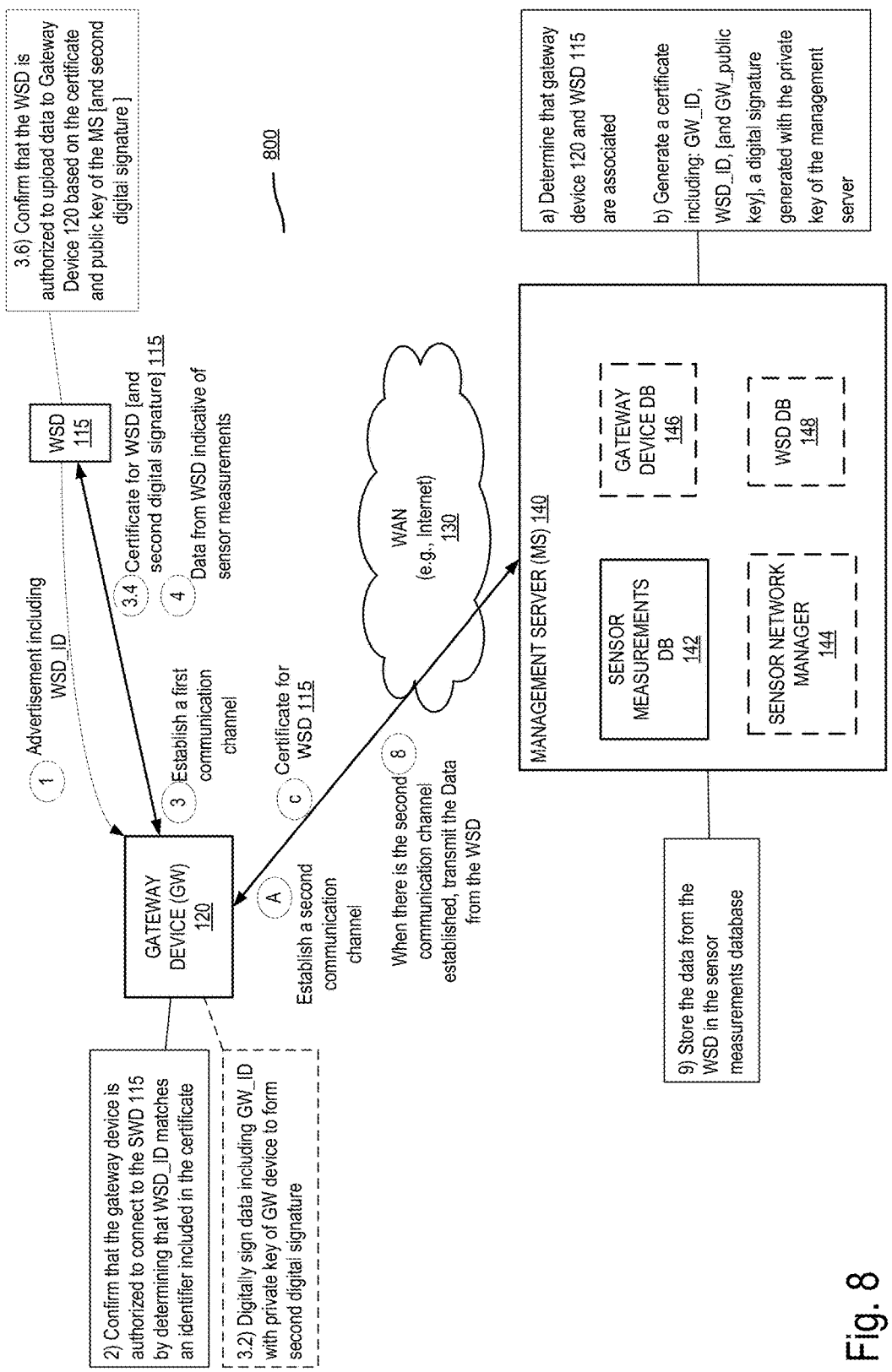
FIG. 8 illustrates a block diagram of an exemplary sensor network for authorizing and authenticating a gateway device to receive sensor measurements in accordance with some embodiments.

FIG. 8 illustrates a block diagram of an exemplary sensor network 800 for authorizing and authenticating a gateway device to receive sensor measurements in accordance with some embodiments. The sensor network 100 includes the wireless sensing device 115, the gateway device 120, and the management server 140. In some embodiments, the wireless sensing device 115, the gateway device 120, and the management server 140 are operative to perform operations similar to the operations described with reference to FIG. 1 (operations 1 to 11). In other embodiments, the wireless sensing device 115, the gateway device 120, and the management server 140 are operative to perform only some of the operations described with reference to FIG. 1 (e.g., operations 1, 2, 3, 4, 8, and 9) and perform additional operations (3.2, 3.4, and 3.6) which may or may not be performed in the sensor network 100 of FIG. 1. As will be described in further detail below, in some embodiments, the operations performed to enable the authorization and authentication of the gateway device can be performed independently of the operations enabling a secure and reliable offload of data from the sensing devices to the management server. In other embodiments, the operations performed to enable the authorization and authentication of the gateway device can be performed together with the operations enabling a secure and reliable offload of data from the sensing devices to the management server described with reference to FIGS. 1-5.

The wireless sensing device (WSD) 115 stores one or more sensor measurements in response to the detection of physical events during a period of time. The sensor measurements are stored in a non-transitory computer readable medium of the WSD 115. The WSD 115 is operative to detect a gateway device (e.g., 120) and negotiate a connection to the gateway device as will be described in further details below.

The gateway device 120 is situated between the WSD 115 and the management server 140. In some embodiments, the gateway device 120 is operative to connect to the WSD 115 and to offload sensor measurements from the WSD 115 when the WSD 115 is associated with the gateway device. In some embodiments, the gateway device 120 is associated with the WSD 115 when both devices are associated with the same organization (i.e., when both devices have been claimed by the same organization for example as described with reference to FIGS. 7A, and 7B). In other embodiments, the devices can be associated when they are both part of a same purchase order (e.g., in this embodiment the devices are associated with a purchase order number). The management server 140 is a cloud based server operative to receive from one or more wireless sensing device (e.g., the WSD 115) sensor measurements through one or more gateway devices (e.g., the gateway device 120).

The system presented herein enables the authentication of the gateway device 120 prior to transmitting the sensor measurements from the wireless sensing device 115 to the management server 140 through the gateway device 120. In an embodiment, the authentication of the gateway device 120 is performed based on a certificate generated by the management server. At operation (a), the management server 140 determines that gateway device 120 and WSD 115 are associated. In some embodiments, the management server 140 determines that the gateway device 120 is associated with the WSD 115 when both devices are associated with the same organization. In one embodiment, the management server 140 looks up each of the WSD database 146 and the gateway devices database 148 to verify that the WSD 115 and the gateway device 120 are associated with the same organization. In some embodiments, this operation is performed at the time a gateway device is being claimed by an organization (e.g., as described with reference to FIG. 7B), or a wireless sensing device is being added to an organization (e.g., as described with reference to FIG. 7A).

At operation (b), the management server 140 generates a certificate to be used for authorizing the gateway device to offload data from the WSD 115. The certificate includes data and a digital signature on the data generated with the private key of the management server. In an embodiment, the data of the certificate includes the identifier of the gateway device 120 (GW_ID) and the identifier of the WSD 115 (WSD_ID). In another embodiment, the data may further include the public key of the gateway device 115 (GW_public key) in addition to the GW_ID and the WSD_ID. At operation (A) the gateway device 120 and the management server 140 establish a second communication channel. In some embodiments, and as described with reference to FIG. 1, this communication channel may be encrypted based on a public-private key exchange protocol (e.g., Transport Layer Security (TSL), or Secure Socket Layer (SSL)). In alternative embodiments, the communication channel is not encrypted. The communication channel is established independently of the connection between the WSD 115 and the gateway device 120. At operation (c), the certificate is transmitted to the gateway device 120 over the second communication channel. In one embodiment the gateway device 115 may receive the certificate when it initially connects to the management server 140 through the WAN 130. In another embodiment the gateway device 115 may receive the certificate when WSD 115 is claimed by the organization to which the gateway device was previously associated. The certificate is an indication that the gateway device and the WSD are part of the same organization.

In an embodiment, at circle 1, the WSD 115 advertises (e.g., through the transmission of a Bluetooth LE advertisement) an identifier (WSD_ID) indicating to any gateway device within range that the WSD 115 is available for connection. At operation 2, upon receipt of the advertisement, the gateway device 120 confirms that it is authorized by the management server 140 to offload data from the WSD 115. The confirmation that the gateway is authorized to offload data from the sensing device may be performed according to various embodiments. In an embodiment, the gateway device may receive from the management server 140 a list of identifiers of WSDs with which it can connect. According to this embodiment, when the gateway receives the WSD_ID, it verifies that this ID is included in the list of authorized sensing devices. In other embodiments, the gateway device 110 may verify that a certificate received from the management server at operation (c) includes the identifier of the WSD 115. The gateway device may further confirm that the certificate is authenticated by verifying, using the public key of the management server 140 stored in the gateway device, that the transmitted data has been signed with the private key of the management server 140.

At circle 3, the gateway device 120 and the WSD 115 establish a first communication channel. In some embodiments, the communication channel is a secure communication channel. In an exemplary embodiment, the devices may negotiate the establishment of the secure communication channel using a shared secret and an encryption protocol (e.g., LE Secure Connections pairing model). The shared secret is stored at the WSD 115 at the time of manufacture as is described with reference to FIGS. 7A. In an embodiment, the secret is transmitted from the management server to the gateway device 120 upon determination that the gateway device 120 and the WSD 115 are associated. For example, the secret can be transmitted with the certificate to the gateway device. In other embodiments, the secure communication channel can be established based on a public/private key protocol using the respective public/private keys of the WSD 115 and the gateway device 120. In alternative embodiments, the communication channel is not secure.

At optional operation (3.2), the gateway device 120 digitally signs data including the identifier of the gateway device (GW_ID), and the public key of the gateway device with the private key of GW device to form a second digital signature. In some embodiments, where the certificate received from the management server 140 includes the identifier of the gateway device and the public key of the gateway device, the gateway device 110 may sign the certificate with the private key of the gateway device to generate the second digital signature.

Flow then moves to operation (3.4) where the certificate is sent to the WSD 115. In some embodiments, the second digital signature is also transmitted with the certificate. Flow then moves to operation (3.6), where the WSD 115 confirms that the gateway device 120 is authorized to offload the data based on the certificate and the public key of the management server. The public key of the management server 140 is stored in the WSD 115 enabling the verification that the digital signature included in the certificate was generated with the private key of the management server confirming that the gateway device (as identified by the identifier in the data of the certificate) is authorized by the management server 140 to offload the data from the WSD 115. In an alternative embodiment, the WSD 115 receives, in addition to the certificate, the second digital signature from the gateway device and may perform an additional verification to confirm the identity of the gateway device (and avoid spoofing of the identifier of the gateway device by a malicious entity which may have intercepted the certificate). The additional verification is based on the confirmation that the public key of the gateway device transmitted to the WSD 115 in the certificate can be used to authenticate the second digital signature confirming that the gateway device 120 is authenticated and authorized to offload data from the WSD 115.

Once the gateway device 120 is authenticated, the WSD 115 may start offloading any recorded sensor measurements to the gateway device. At circle 4, the WSD 125 transmits data indicative of sensor measurements taken over time. In some embodiments, the data offloaded includes at least one of a sequence number and a time stamp to enable the management server 140 to reconcile data of a WSD received from various gateway devices or from the same gateway device over a period of time. In alternative embodiments, the data may not include the additional information (e.g., sequence number or time stamp). The data is then stored at operation 9 in a sensor measurements database 142 of the management server 140. In some embodiments the offload of the data from the WSD 115 to the management server 140 is resilient to intermittent connectivity between the different device and to the mobility of the WSD or gateway device. In some embodiments, the operations 5-7, 10, and 11 of FIG. 1 may be performed in addition to the other operation of FIG. 8 to enable the reliable offload of data in scenarios of intermittent connectivity between the devices and mobility of the gateway device or the WSD.

FIG. 9 illustrates a flow diagram of exemplary operations 900 performed in a sensing device for authorizing and authenticating a gateway device to receive sensor measurements in accordance with some embodiments. At operation 910, the WSD 115 receives, from the gateway device 120, a certificate. The certificate was generated by the management server 140 upon a determination that the gateway device 120 and the wireless sensing device 115 are associated. The certificate is a digital document including data and a digital signature, where the digital signature was generated by the management server 140 based on the data and a private key of the management server. The data of the certificate includes a first identifier and a second identifier. In some embodiments, the data of the certificate further includes a public key of the gateway device 120, and the certificate is transmitted with a second digital signature. The second digital signature is generated at the gateway device with a private key of the gateway device based upon the certificate.

Flow then moves to operation 920 where the wireless sensing device confirms that it is authorized to upload data to the gateway device. The confirmation includes performing the operation 922, where the WSD checks that the second identifier matches a sensing device identifier stored in the wireless sensing device, and further includes performing the operation 924 wherein the WSD authenticates the certificate using a public key associated with the private key of the management server. In some embodiments, the public key of the management server was stored in the WSD at the time of manufacture (e.g., as described with reference to FIG. 6A). In some embodiments, the confirmation may further include performing operation 923 where the WSD authenticate the second digital signature using the public key of the gateway device that is part of the certificate.

Flow then moves to operation 930 where in response to the confirmation that the wireless sensing device is authorized to upload data to the gateway device, the WSD uploads to the gateway device data indicative of a plurality of sensor measurements taken over time to be transmitted to the management server, wherein the plurality of sensor measurements are representative of physical events detected at the wireless sensing device.

Figure 10:
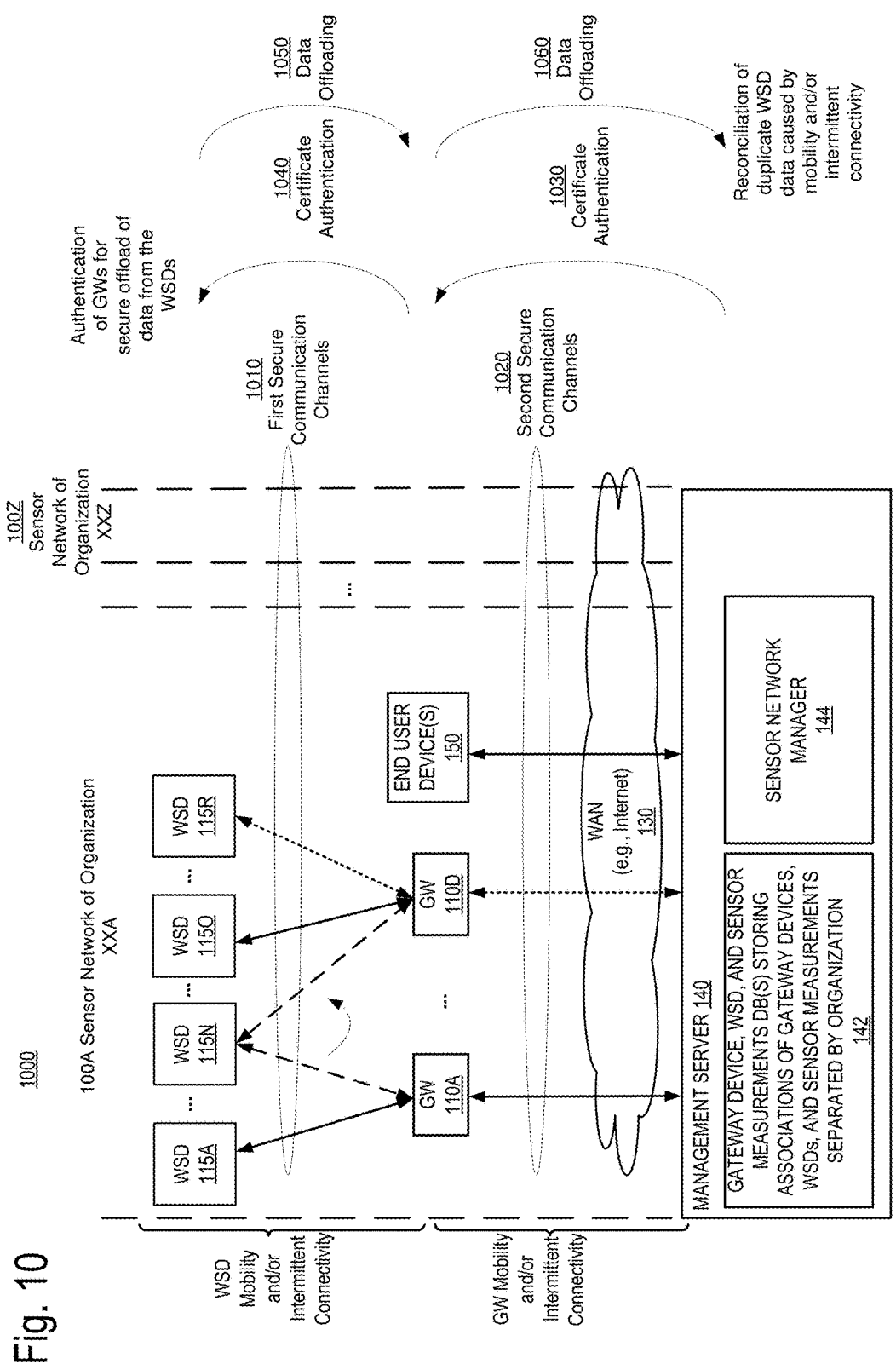
FIG. 10 illustrates a block diagram of exemplary sensor networks enabling secure and reliable offload of sensor measurements in an environment of intermittent connectivity and mobility in accordance with some embodiments.

FIG. 10 illustrates a block diagram of exemplary sensor networks 1000 enabling secure and reliable offload of sensor measurements in an environment of intermittent connectivity and mobility in accordance with some embodiments. The management server 140 provide a sensor network service to one or more organization. As illustrated in FIG. 10, the management server 140 may be coupled, through the WAN 130, to a plurality of gateway devices and wireless sensing devices forming multiple sensor networks (e.g., 100A-100Z) belonging to respective organizations (e.g., XXA-XXZ). Each organization possesses a set of wireless sensing devices and gateways for monitoring physical events (e.g., monitoring the temperature of refrigerated goods being transported, monitoring fleets of vehicles by recording location, movement and/or acceleration information, monitoring humidity and/or temperature at various locations within a room or a building, etc.). In some embodiments, for each sensor network of a given organization, the sensor network service enables a secure and reliable offload of data in a multi-tenant environment where the offload of data is resilient to mobility of the gateway and wireless sensing devices as well as to intermittent connectivity of the devices.

Sensor Network 100A of organization "XXA" is an exemplary deployment of a sensor network including a plurality of wireless sensing devices and gateway devices. The sensor network 100A includes a plurality of WSDs coupled with one or more gateway devices. For example, WSDs 115A to 115N are coupled to gateway device (GW) 110A, WSDs 1150 to 115R are coupled with GW 110D, etc.

While four WSDs, and two gateway devices are illustrated, the sensor network 100A may include more WSDs and gateway devices. Each one of the gateway devices may be mobile or stationary. For example, the GW 110D may be a mobile gateway device located within a vehicle transporting goods, which also includes one or more mobile WSDs that can connect to the gateway device. The sensor network service enables the offload of data (operations 1050 and 1060) from the wireless sensing devices (e.g., 115A-115N) to the management server 140 through a first secure communication channel between 1010 the GWs (e.g., GW 110A-110D) and the WSDs and through a second secure communication channel 1020 between the management server 140 and the GWs of the sensor network 100A. In some embodiments, the secure offload of data can be performed in addition to the verification that the gateway devices are authorized to WSDs from the same organization. In these embodiments, the use of a certificate enables the sensor network service to guarantee that sensor measurements recorded by a wireless sensing device of a given organization (e.g., organization XXA) can only be offloaded to the management server through gateway devices that also belong to the same organization. The certificate is received from the management server through the gateway device (e.g., as illustrated by operations 1030 and 1040) and is used by each WSD to authenticate a gateway device to prior to offloading data to this gateway device.

In some embodiments, the sensor network service enables the WSDs to offload data to one of the gateway devices of the same organization as soon as one of the gateway devices is within range of the WSD and a connection is established, while deleting data only when a confirmation is received from the gateway devices. In addition, the gateway devices are operative to store the data from the WSDs and offload to the management server when a connection is established without deletion of the data prior to the receipt of an acknowledgement message from the management server. This ensures that all data transmitted from the WSDs is received at the management server 140 even in scenarios of mobility of the devices or intermittent connectivity. The management server 140 reconciles the data received from each WSD through one or more gateway devices (which may occur potentially following multiple connection interruptions or mobility of the WSD) to present to a user of the organization an uninterrupted representation of the sensor measurements of each WSD (as illustrated in FIGS. 21-24).

The sensor network service is a multi-tenant service and may process and manage data from various sensor networks (e.g., 100A, 100Z) belonging to different organizations while ensuring that data recorded by a WSD of a first organization (e.g., XXA) is not transmitted to a user of the second organization (e.g., XXZ).

While the embodiments described with reference to FIG. 10 show a sensor network system enabling secure offload of data in a mobile and intermittent connectivity environment as well as enabling the authentication of the gateway devices, in other embodiments the sensor network system may enable either one of these features independently. For example, a sensor network system may provide a reliable and secure offload of data from the wireless sensing devices to the management server 140 without requiring the authentication of the gateway device through the use of a certificate received at the sensing devices from the management server. Alternatively a sensor network system may provide a reliable and secure offload of data from the wireless sensing devices to the management server 140 while enabling authentication of the gateway device, where the authentication is either performed through the use of a certificate received at the sensing devices from the management server or through another authentication mechanism (e.g., secrets shared between the WSDs and the gateway devices).

Architecture

The gateway devices, wireless sensing devices, and the management server described with reference to FIGS. 1-10 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 11:
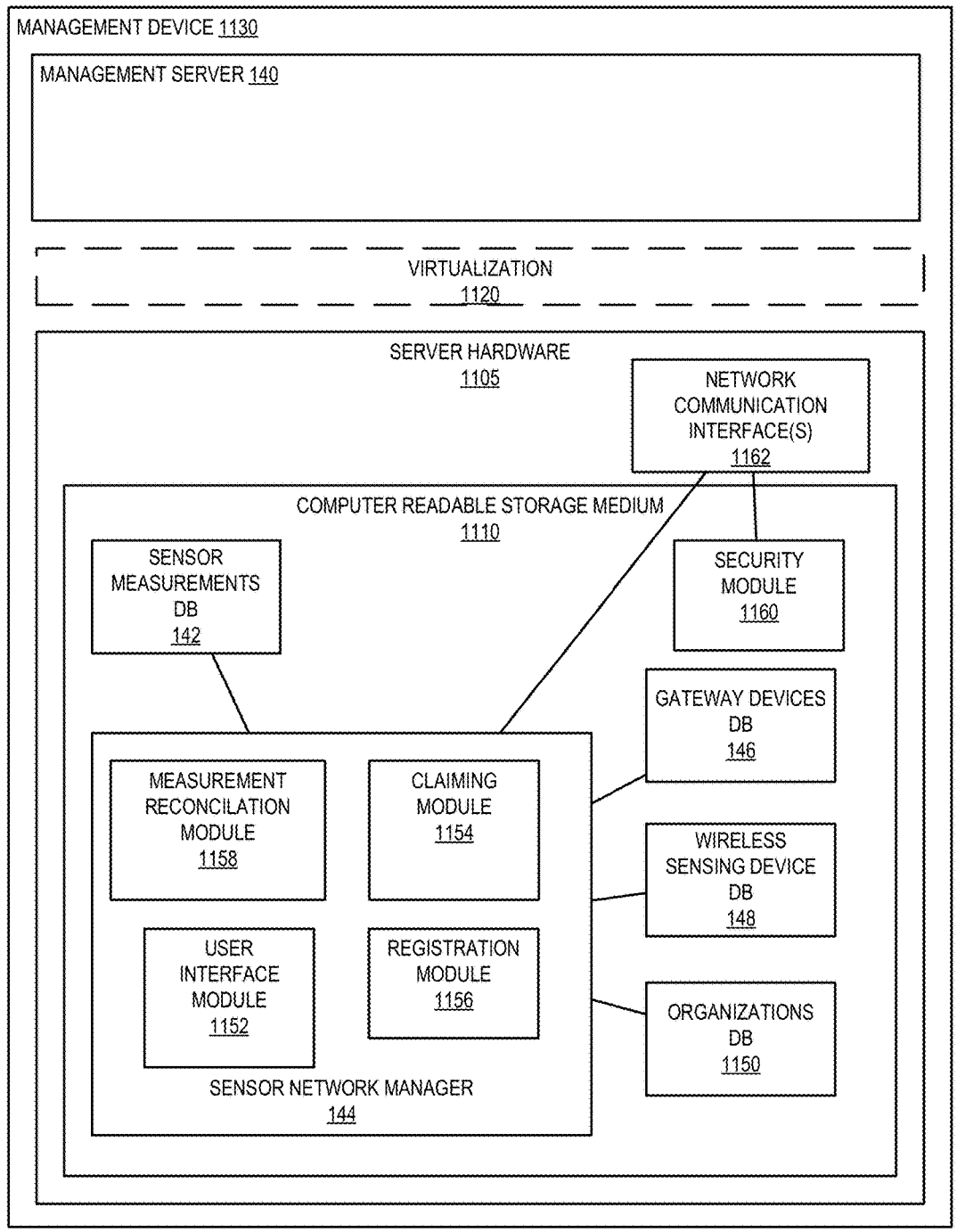
FIG. 11 illustrates a block diagram for an exemplary server management that can be used in some embodiments.

FIG. 11 illustrates a block diagram for an exemplary server management that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and gateway devices managed by the same management server.

According to one embodiment, management server 140 is implemented on a server device 1a30 which includes server hardware 1105. Server hardware 1105 includes network communication interfaces 1162 coupled with a sensor network manager 144 and a computer readable storage medium 1110. The computer readable storage medium 1110 includes a security module 1160 used to manage the cryptographic keys associated with the gateway devices and the wireless sensing devices and to establish secure communication with the devices as well as generate the certificate for each WSD. The computer readable storage medium 1110 includes a sensor network manager 144 used to configure and manage the WSDs and gateway devices for each organization. For example, the sensor network manager 144 includes a registration module 156 which receives and manages information related to the WSDs and gateway devices at the time of manufacture. The sensor network manager 144 includes the claiming module 1154 which is used when devices are claimed by organizations (e.g., the claiming may be performed at least in part by populating the gateway devices database 146, the wireless sensing device database 148, and the organization database 1150 with appropriate information when the WSDs and gateway devices are associated to an organization). The sensor network manager 144 further includes a measurement reconciliation module 1158 used to reconcile data received for each WSD associated with an organization in scenarios including intermittent connectivity between the devices and mobility of the devices.

In an embodiment, the sensor network manager 144 provides a user interface module 1152 user to create a Web interface to allow the administrators of the sensor networks to create and log into an account associated with an organization to which a set of WSD and gateway devices belong (e.g., WSD 115, and gateway device 120). The computer readable storage medium 1310 sensor measurements database 142 (including data indicative of sensor measurements received from the WSDs), gateway devices database 146 (including information regarding the gateway devices), a wireless sensing device database 148 (including information regarding the WSDs), and an organizations database 1150 (including information regarding the organizations to which the WSDs and gateway devices belong). In one embodiment, the WSD database 148 includes an identifier of each WSD (e.g., a serial number) a secret to be used to establish a secure communication with the gateway devices of the same organization, and a mechanism to authenticate the WSD's identity (e.g., the public key of a private public key pair, the private key of which was embedded or stored in the wireless sensing device during the manufacturing). The gateway devices database 146 includes an identifier of each gateway device (e.g., a serial number), and a mechanism to authenticate the gateway device's identity and to securely communicate with the gateway device (e.g., the public key of a private public key pair, the private key of which was embedded or stored in the gateway device during the manufacturing).

While one embodiment does not implement virtualization, alternative embodiments may use different forms of virtualization—represented by a virtualization layer 1120. In these embodiments, the management server 140 and the hardware that executes it form a virtual management server which is a software instance of the modules stored on the computer readable storage medium 1110.

Figure 12:
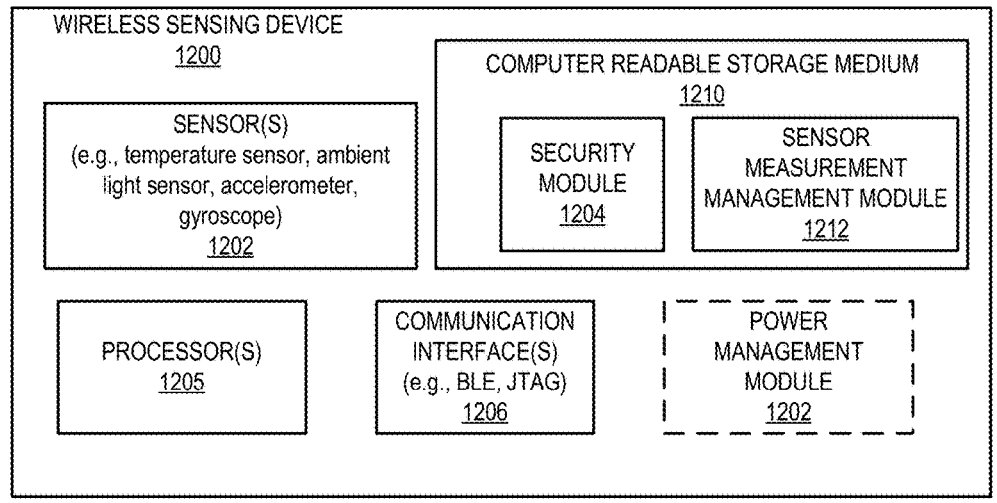
FIG. 12 illustrates a block diagram of an exemplary wireless sensing device that can be used in some embodiments.

FIG. 12 illustrates a block diagram of an exemplary wireless sensing device 1200 that can be used in some embodiments. Wireless sensing device 1200 includes one or more processors 1205 and connected system components (e.g., multiple connected chips). The wireless sensing device 1200 includes computer readable storage medium 1210, which is coupled to the processor(s) 1205. The computer readable storage medium 1210 may be used for storing data, metadata, and programs for execution by the processor(s) 1205. For example, the depicted computer readable storage medium 1210 may store security module 1204 and sensor measurement management module 1212 that, when executed by the processor(s) 1205, causes the WSD 1200 (e.g., WSD 115) to reliably and securely offload data to a gateway device to be transmitted to the management server. For example, the security module 1204 may store the secret and the public key of the management server, as well as a private key of the WSD. The security module 1204, when executed by the processor(s) 1205 causes the WSD to negotiate a secure communication channel with a gateway device and authenticate the gateway device prior to transmitting data indicative of the sensor measurements to the management server through the gateway device. While the security module 1204 is illustrated as code stored on the computer readable storage medium, in other embodiments the security module 1204 may be implemented in hardware or in a combination of hardware and software.

The sensor measurement management module 1212 may include code which when executed on the processor(s) 1205 cause the WSD to store sensor measurements, and delete sensor measurements as described with respect to embodiments of FIGS. 1-5, and FIGS. 8-9. The sensor measurement management module 1212 may further be operative to store the sensor measurement efficiently in the WSD prior to their offload to the management server. In some embodiments, the sensor measurement management module 1212 may cause the WSD to adapt a rate at which it generates sensor measurements based on how much storage space is available at the WSD. For example, when space is not an issue, temperature changes of 0.1 degree Celsius (C.) may be logged. Alternatively, if the storage at the WSD is limited (e.g., only 50% of the space at the computer readable storage medium is available), the sensor measurement management module 1212 may configure the WSD to record and store temperature changes which exceed 2° C. In some embodiments, the sensor measurement management module 1212, may include a lossy compaction algorithm to remove sensor measurements when it runs out of space. In a non-limiting example, sensor measurements that are close in time to other sensor measurements may be discarded. Sensor measurements may be assigned a priority weight (e.g., high weight is given to extremes values) and measurements with low priorities may be deleted when space is an issue.

The WSD 1200 also includes one or more sensor(s) to detect physical events and store sensor measurements in the computer readable storage medium 1210 in response to the detection of the physical events. In some exemplary embodiments, the one or more sensor(s) include at least one of a temperature sensor, an ambient light sensor, an accelerometer, and a gyroscope, etc.

The WSD 1200 also includes one or more communication interfaces 1206, which are provided to allow a user to provide input to, receive output from, and otherwise transfer data to and from the WSD. Exemplary Input/Output devices and interfaces 1206 include wired and wireless transceivers, such as Joint Test Action Group (JTAG) transceiver (for receiving an initial configuration including a WSD identifier, a public key of the management server, a secret to be shared with the gateway device, and optionally including a public/private key of the WSD), a Bluetooth Low Energy (LE) transceiver (for advertising an identifier of the WSD, and for connecting to the gateway device), an IEEE 802.11 transceiver, an infrared transceiver, a wireless cellular telephony transceiver (e.g., 2G, 3G, 4G), or another wireless protocol to connect the WSD 1200 with another device, external component, or a network and receive stored instructions, data, tokens, etc. It will be appreciated that one or more buses may be used to interconnect the various components shown in FIG. 12.

It will be appreciated that additional components, not shown, may also be part of the WSD 1200, and, in certain embodiments, fewer components than that shown in FIG. 12 may also be used in a WSD 1200. For example, in some embodiments the wireless sensing device does not include the power management module 1202.

Figure 13:
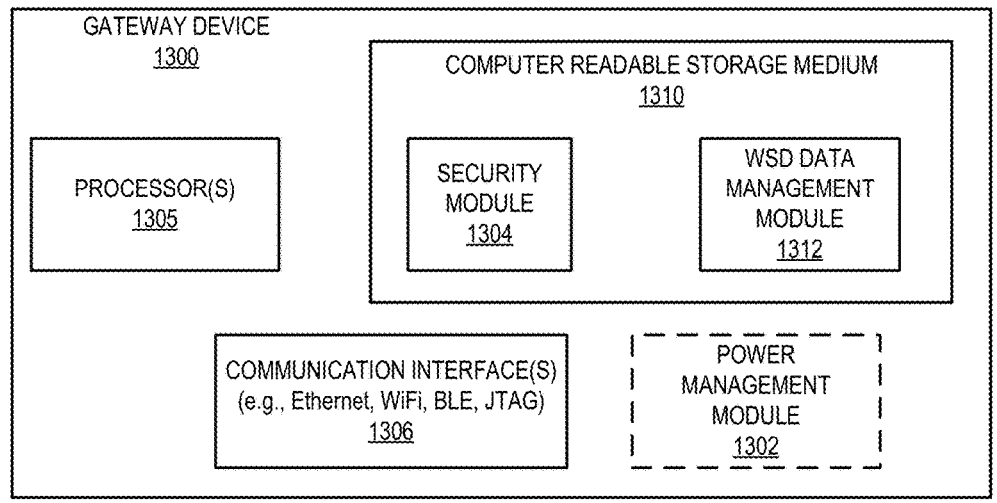
FIG. 13 illustrates a block diagram of an exemplary gateway device that can be used in some embodiments.

FIG. 13 illustrates a block diagram of an exemplary gateway device that can be used in some embodiments. Gateway device 1300 includes one or more processors 1305 and connected system components (e.g., multiple connected chips). The gateway device 1300 includes computer readable storage medium 1310, which is coupled to the processor(s) 1305. The computer readable storage medium 1310 may be used for storing data, metadata, and programs for execution by the processor(s) 1305. For example, the depicted computer readable storage medium 1310 may store security module 1304 and WSD data management module 1312 that, when executed by the processor(s) 1305, causes the gateway device 1300 (e.g., gateway device 120) to reliably and securely offload data from a WSD and to transmit the data to the management server regardless of whether the connectivity of the gateway device (to either the WSD or the management server) is intermittent. For example, the security module 1304 may be used to store the secret (that is received from the management server) and the public key of the management server, as well as a private key of the gateway device. The security module 1304, when executed by the processor(s) 1305 causes the gateway device to negotiate a secure communication channel with a WSD and confirm that it is authorized to receive data indicative of the sensor measurements from the WSD. While the security module 1304 is illustrated as code stored on the computer readable storage medium, in other embodiments the security module 1304 may be implemented in hardware or in a combination of hardware and software. The WSD data management module 1312 may include code which when executed on the processor(s) 1305 cause the gateway device to store data indicative of sensor measurements received from the WSD, and delete the data as described with respect to embodiments of FIGS. 1-5, and FIGS. 8-9.

The gateway device 1300 also includes one or more communication interfaces 1306, which are provided to allow a user to provide input to, receive output from, and otherwise transfer data to and from the system. Exemplary Input/Output devices and interfaces 1206 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway device 1300 with another device, external component, or a network and receive stored instructions, data, tokens, etc. It will be appreciated that one or more buses may be used to interconnect the various components shown in FIG. 13.

It will be appreciated that additional components, not shown, may also be part of the gateway device 1300, and, in certain embodiments, fewer components than that shown in FIG. 13 may also be used in a gateway device 1300. For example, in some embodiments the wireless sensing device does not include the power management module 1302.

While some components of the WSD, gateway device, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a gateway device for enabling secure offline data logging in a sensor network, the method comprising:
   receiving from a wireless sensing device an advertisement message indicating it is available for connecting to a gateway device;
   confirming that the gateway device has been authorized by a management server to offload from the wireless sensing device sensor measurements taken over time by the wireless sensing device and stored in a non-transitory machine readable storage medium of the wireless sensing device;
   establishing a first secure communication channel with the wireless sensing device;
   receiving from the wireless sensing device, through the first secure communication channel, data indicative of a plurality of sensor measurements taken over time, a sequence number for each, and a time stamp for each;
   transmitting from the gateway device an acknowledgement message to the wireless sensing device that indicates that the data has been received by the gateway device and that instructs the wireless sensing device to delete the plurality of sensor measurements from the wireless sensing device;
   if there is not currently a second secure communication channel established between the gateway device and the management server, storing the data in a non-transitory machine readable storage medium of the gateway device;
   when there is the second secure communication channel established between the gateway device and the management server, transmitting to the management server the data; and
   receiving an acknowledgement message from the management server that indicates that the data has been received by the management server and that instructs the gateway device to delete the data from gateway device.

2. The method of claim 1, wherein the time stamp indicates a time at which the sensor measurement is generated.

3. The method of claim 1, wherein the sequence numbers indicate an order of each of the plurality of sensor measurements with respect to others of the plurality of sensor measurements generated at the wireless sensing device.

4. A gateway device to be coupled with a wireless sensing device of a sensor network, wherein the sensor network includes a management server, the gateway device comprising:
   a communication interface to receive from a wireless sensing device an advertisement message indicating it is available for connecting to a gateway device;
   a non-transitory computer readable storage medium to store instructions; and
   a processor coupled with the non-transitory computer readable storage medium to process the stored instructions to:
      confirm that the gateway device has been authorized by a management server to offload from the wireless sensing device sensor measurements taken over time by the wireless sensing device and stored in a non-transitory machine readable storage medium of the wireless sensing device,
      establish through the communication interface a first secure communication channel with the wireless sensing device, receive through the communication interface from the wireless sensing device, through the first secure communication channel, data indicative of a plurality of sensor measurements taken over time, a sequence number for each, and a time stamp for each, transmit from the gateway device an acknowledgement message to the wireless sensing device that indicates that the data has been received by the gateway device and that instructs the wireless sensing device to delete the plurality of sensor measurements from the wireless sensing device, if there is not currently a second secure communication channel established between the gateway device and the management server, store the data in the non-transitory computer readable storage medium of the gateway device, when there is the second secure communication channel established between the gateway device and the management server, transmit to the management server the data; and receive through the communication interface an acknowledgement message from the management server that indicates that the data has been received by the management server and that instructs the gateway device to delete the data from gateway device.

5. The gateway device of claim 4, wherein the time stamp indicates a time at which the sensor measurement is generated.

6. The gateway device of claim 4, wherein the sequence numbers indicate an order of each of the plurality of sensor measurements with respect to others of the plurality of sensor measurements generated at the wireless sensing device.

* * * * *